(12) United States Patent
Henning et al.

(10) Patent No.: US 10,798,184 B2
(45) Date of Patent: *Oct. 6, 2020

(54) SYSTEM AND METHOD FOR PROGRAMMING AN EMBEDDED SYSTEM

(71) Applicant: AutoAuto, LLC, Austin, TX (US)

(72) Inventors: Ryan Zachary Henning, Austin, TX (US); Paul Jeong-In Yim, Austin, TX (US)

(73) Assignee: AutoAuto, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,377

(22) Filed: Jul. 3, 2019

(65) Prior Publication Data
US 2019/0327309 A1 Oct. 24, 2019

Related U.S. Application Data

(63) Continuation of application No. 15/979,365, filed on May 14, 2018, now Pat. No. 10,389,820.

(60) Provisional application No. 62/577,593, filed on Oct. 26, 2017, provisional application No. 62/580,050, filed on Nov. 1, 2017.

(51) Int. Cl.
| | |
|---|---|
| G06F 15/16 | (2006.01) |
| H04L 29/08 | (2006.01) |
| H04L 29/06 | (2006.01) |
| G09B 19/00 | (2006.01) |
| G06F 16/951 | (2019.01) |
| H04W 12/00 | (2009.01) |

(52) U.S. Cl.
CPC ......... *H04L 67/141* (2013.01); *G06F 16/951* (2019.01); *G09B 19/0053* (2013.01); *H04L 63/10* (2013.01); *H04L 67/025* (2013.01); *H04L 67/125* (2013.01); *H04L 67/34* (2013.01); *H04W 12/003* (2019.01)

(58) Field of Classification Search
None
See application file for complete search history.

(56) References Cited

U.S. PATENT DOCUMENTS

| | | | |
|---|---|---|---|
| 7,117,266 B2 * | 10/2006 | Fishman | H04L 29/06 709/228 |
| 9,569,954 B2 | 2/2017 | Ganz et al. | |
| 2007/0293124 A1 | 12/2007 | Smith et al. | |

(Continued)

*Primary Examiner* — Phuoc H Nguyen

(57) ABSTRACT

Systems and methods for programming an embedded system include establishing a first communication link between a user device and a remote multiplexer, and a second communication link between a single-board computer and the remote multiplexer. In some embodiments, the user device executes a web browser that provides an application interface. By way of example, instructions for operating the single-board computer are received at the remote multiplexer from the web browser. In some embodiments, the remote multiplexer also receives a first identifier that identifies the user device and a second identifier that identifies the single-board computer. In some cases, the instructions and the first identifier are transmitted from the remote multiplexer to the single-board computer based on the second identifier. In various embodiments, the single-board computer is configured to execute the instructions and control a robotic device within which the single-board computer is embedded.

20 Claims, 16 Drawing Sheets

(56) References Cited

U.S. PATENT DOCUMENTS

| | | | |
|---|---|---|---|
| 2009/0197593 A1* | 8/2009 | Farrell | H04W 76/10 455/426.1 |
| 2011/0117845 A1* | 5/2011 | Kirsch | H04M 1/6091 455/41.2 |
| 2011/0215899 A1* | 9/2011 | Van Wiemeersch | B60R 25/04 340/5.24 |
| 2014/0380296 A1 | 12/2014 | Pal et al. | |
| 2015/0364060 A1 | 12/2015 | Gupta et al. | |
| 2016/0070559 A1 | 3/2016 | West et al. | |
| 2016/0098870 A1* | 4/2016 | Bergerhoff | G07C 9/00007 340/5.61 |
| 2016/0284232 A1 | 9/2016 | Sisamos | |
| 2016/0295414 A1* | 10/2016 | Giraud | G07C 5/008 |
| 2016/0379519 A1 | 12/2016 | Gupta et al. | |
| 2017/0011561 A1* | 1/2017 | Makke | G07C 5/008 |
| 2017/0053550 A1 | 2/2017 | Lau et al. | |
| 2017/0316621 A1* | 11/2017 | Jefferies | G07C 5/0808 |
| 2017/0366521 A1* | 12/2017 | Lei | H04L 63/0236 |
| 2018/0091930 A1* | 3/2018 | Jefferies | H04L 67/125 |

* cited by examiner

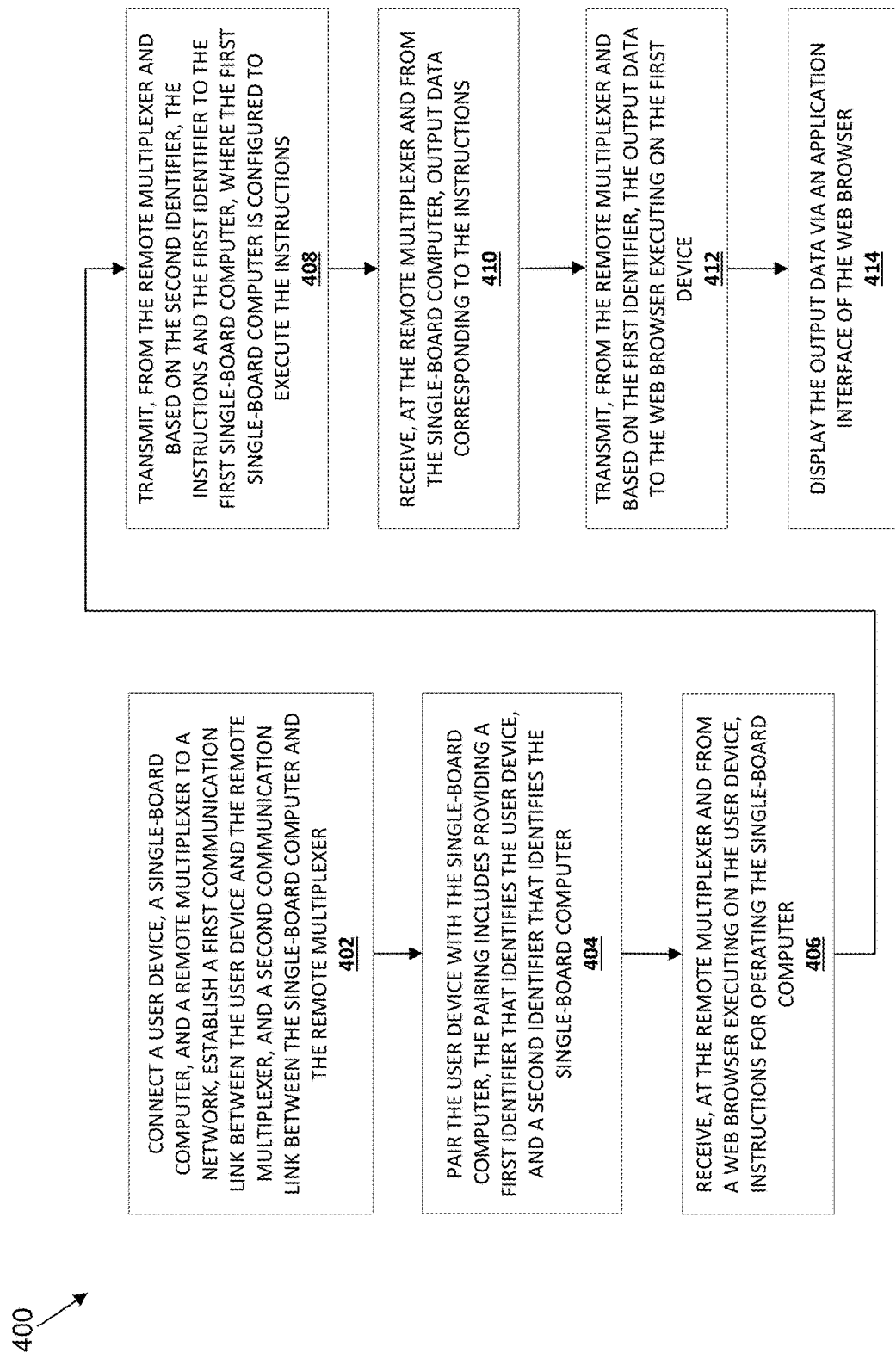

SYSTEM AND METHOD FOR PROGRAMMING AN EMBEDDED SYSTEM

CROSS-REFERENCE TO RELATED APPLICATIONS

This application is a continuation of U.S. patent application Ser. No. 15/979,365, which claims the benefit of U.S. Provisional Application No. 62/577,593, filed Oct. 26, 2017 and U.S. Provisional Application No. 62/580,050, filed Nov. 1, 2017, the disclosures of which are hereby incorporated by reference in their entirety.

BACKGROUND

The electronics industry has continued to experience rapid technological advancements that have resulted in smaller and faster electronic devices which are simultaneously able to support a greater number of increasingly complex and sophisticated functions. Such advancements have enabled the manufacture of powerful mobile computing devices such as single-board computers. Generally, single-board computers provide a complete set of common computer components integrated onto a single circuit board. For example, a single-board computer may include a processor, memory, input/output (I/O) interfaces, as well as other appropriate features. Single-board computers may be embedded within a variety of devices such as robots, drones, security monitoring devices, medical devices, industrial equipment, or other types of devices. In some cases, single-board computers may also be used for educational purposes, for example, to teach students computer programming.

Regardless of the particular application, single-board computers may from time to time need to be programmed or reprogrammed by having a sequence of instructions (computer code) written to a memory of and executed by the single-board computer. In some examples, a single-board computer may be programmed locally by providing persistent physical access to the single-board computer (e.g., using a keyboard and/or mouse). Such persistent physical access can be difficult, for example, when the single-board computer is embedded within another device or located in a remote area. In another example, a physical cable, such as a universal serial bus (USB) cable, may be used to connect a personal computer to the single-board computer. In some cases, short-range wireless communication (e.g., Bluetooth®) may also be used to provide the connection between the personal computer and the single-board computer. Whether using a physical cable or short-range wireless communication, physical proximity to the single-board computer is required and can be challenging when the single-board computer is embedded within another device or located in a remote area. In other cases, a user may write code on their personal computer, copy the code to a memory device (e.g., such as a USB flash drive or an SD card), and manually provide the code to the single-board computer using the memory device by connecting the memory device to an I/O interface of the single-board computer. In this example, while the personal computer may not have to remain in physical proximity to the single-board computer, transferring the code from the memory device to the single-board computer would nevertheless require physical access to the single-board computer. This could also result in a significant time delay, for example, from when the code is written (e.g., at the personal computer) to when the code is delivered (e.g., via the memory device) to the single-board computer. Thus, existing methods for programming single-board computers have not proved entirely satisfactory in all respects.

BRIEF DESCRIPTION OF THE FIGURES

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. Additionally, it should be appreciated that like reference numerals may be used to identify like elements illustrated in one or more of the figures, wherein showings therein are for purposes of illustrating embodiments of the present disclosure and not for purposes of limiting the same.

FIG. 4 is a flow chart illustrating an embodiment of a method for programming an embedded system, in accordance with some embodiments;

DETAILED DESCRIPTION

Figure 1A:
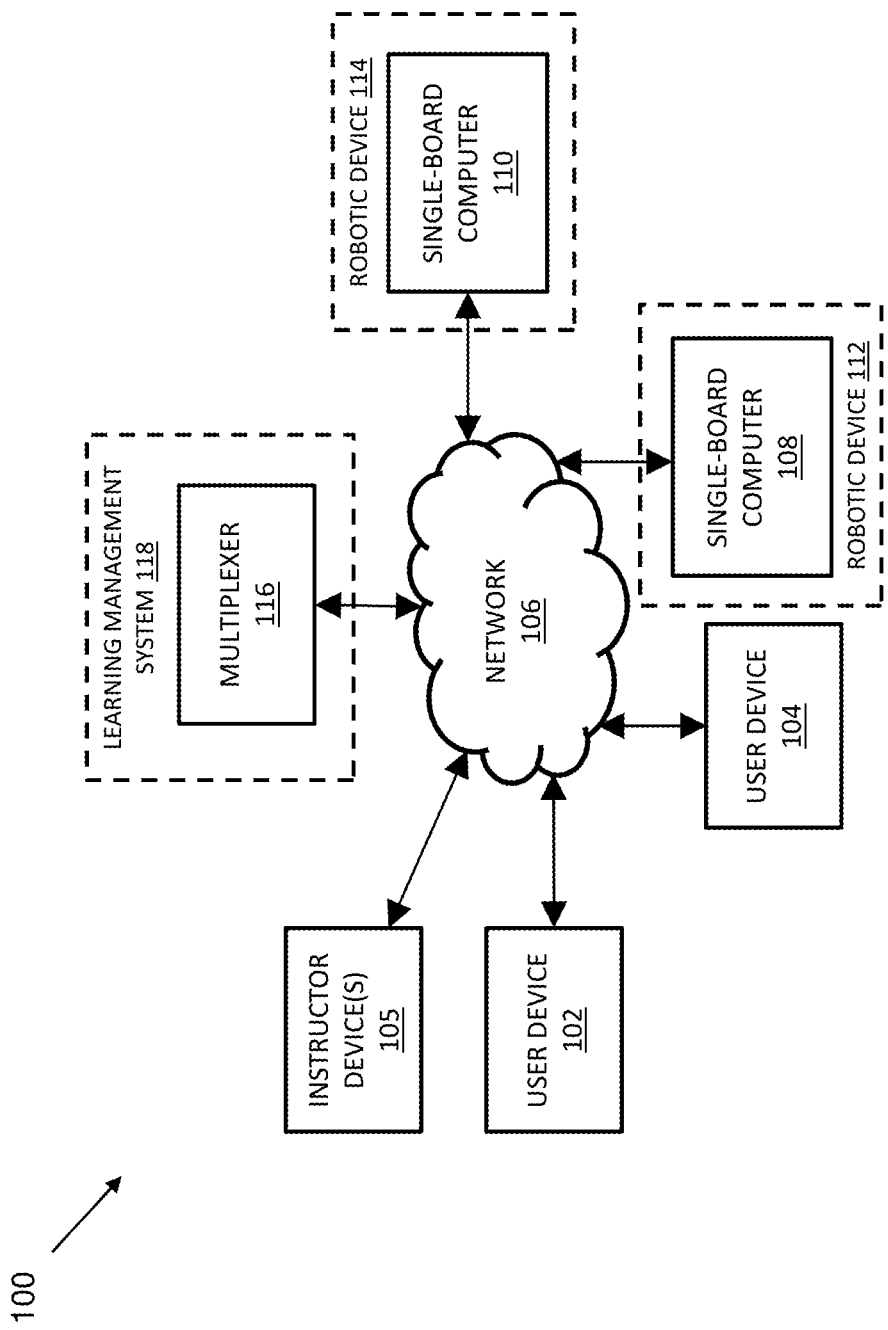
FIG. 1A is a schematic view illustrating a system for programming an embedded system, according to some embodiments.

The following disclosure provides many different embodiments, or examples, for implementing different features of the provided subject matter. Specific examples of components and arrangements are described below to simplify the present disclosure. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

The various embodiments discussed herein generally provide a system and method for programming an embedded system. For purposes of this disclosure, an embedded system may include a single-board computer embedded within a variety of different devices such as robots, drones, security monitoring devices, medical devices, industrial equipment, or other types of devices. In some cases, single-board computers may also be used for educational purposes, for example, to teach students computer programming. Additionally, embodiments described herein may be equally applicable to any type of user (e.g., individual, student, instructor, or other type of user) operating any type of computing device such as a laptop, a desktop, a mobile device, or other appropriate computing device, and where the computing device is able to access the Internet (e.g., through an Internet connection). Furthermore, in various embodiments, the computing device(s) described herein may execute a web-based application that provides for one or more aspects of the present disclosure.

As noted above, single-board computers may need to be programmed or reprogrammed from time to time. The programming or reprogramming may be accomplished by writing a sequence of instructions (computer code) to a memory of the single-board computer for execution by the single-board computer. There are currently a number of ways, which are largely inconvenient, to program or reprogram a single-board computer. For example, a single-board computer may be programmed locally by providing persistent physical access to the single-board computer (e.g., using a keyboard and/or mouse), by using a physical cable (e.g., a USB cable) to connect a personal computer to the single-board computer, or by using short-range wireless communication (e.g., Bluetooth®) to provide the connection between the personal computer and the single-board computer. Whether providing persistent physical access (e.g., using a keyboard and/or mouse), using a physical cable, or using short-range wireless communication, physical proximity and/or persistent physical access to the single-board computer is required and can be challenging when the single-board computer is embedded within another device or located in a remote area. Alternatively, in other cases, a user may write code on their personal computer, copy the code to a memory device (e.g., such as a USB flash drive or an SD card), and manually provide the code to the single-board computer using the memory device by connecting the memory device to an I/O interface of the single-board computer. In this example, while the personal computer may not have to remain in physical proximity to the single-board computer, transferring the code from the memory device to the single-board computer would nevertheless require physical access to the single-board computer. This could also result in a significant time delay, for example, from when the code is written (e.g., at the personal computer) to when the code is delivered (e.g., via the memory device) to the single-board computer.

As also noted, single-board computers may additionally be used for educational purposes, for example, to teach students computer programming. Moreover, considering that a single-board computer may be embedded within another device such as a robot, it may further be necessary or desirable to teach students about robotics. Thus, whether teaching students programming or robotics, a unique set of challenges is presented. Currently, for example, programming may be taught as a stand-alone topic, apart from student interaction with a robotic device in physical space. Likewise, in some current examples, robotics may be taught as a stand-alone topic, apart from learning techniques for how to program a robotic device. Both of these methods that teach programming and robotics as distinct, stand-alone topics may only provide a student with a fraction of the understanding they could gain in a course where programming and robotics are taught in a more integrated manner. In some examples, programming and robotics may be taught in the same classroom, but teaching a programming-related topic remains very disconnected from delivering code to and interacting with a robotic device. For example, a student may learn a programming-related topic using a first platform (e.g., such as a learning management system), but the student may actually program the robotic device using a completely different second platform (e.g., such as providing persistent physical access, using a physical cable, using short-range wireless communication, or using a memory device such as a USB flash drive or an SD card). In addition to the teaching of a programming-related topic being highly disconnected from code delivery, the recited code delivery methods have several disadvantages, as discussed above. Thus, existing methods for programming single-board computers, and for teaching students programming and/or robotics, have not proved entirely satisfactory in all respects.

Embodiments of the present disclosure offer advantages over the existing art, though it is understood that other embodiments may offer different advantages, not all advantages are necessarily discussed herein, and no particular advantage is required for all embodiments. For example, embodiments of the present disclosure provide a system and method for programming an embedded system, such as an embedded single-board computer (SBC), in real-time and in a manner that is largely transparent to a user. In some embodiments, a user operating a computing device (e.g., such as a laptop, a desktop, a mobile device, or other appropriate computing device) may utilize the computing device to write, load, or modify computer code and subsequently deliver and execute the computer code in real-time on a separate and distinct single-board computer. In some embodiments, the computing device may execute a web-based application (e.g., within a web browser executing on a user device) with which the user interfaces and through which the user provides the computer code for delivery and execution by the single-board computer. In the various embodiments described herein, delivery of the computer code from the user's computing device to the single-board computer is mediated by a multiplexing system (e.g., a "multiplexer"). In some examples, the multiplexer may be located on a remote server or remote computer. In some embodiments, the computing device, operating on a local network, is configured for communication with the multiplexer via a first communication link or a first communication channel (e.g., through an Internet connection). The single-board computer may likewise be configured for communication with the multiplexer via a second communication link or a second communication channel (e.g. through an Internet connection) different than the first communication link or the first communication channel. In operation, and as merely one example, computer code written, loaded, or modified at the computing device may be delivered from the computing device to the multiplexer, for example, along with an identifier that identifies a particular single-board computer to be programmed. The multiplexer, in turn, may use the identifier to deliver the code to the identified single-board computer. Upon receiving the code, the single-board computer may compile, interpret, and/or execute the code in a similar manner as if the user had entered the code directly into the single-board computer (e.g., using a keyboard and/or mouse). From the perspective of the user, the code may appear to be delivered directly, and in real-time, from the computing device to the single-board computer via a single communication link (e.g., via short-range wireless communication). However, in the embodiments disclosed herein, the code is delivered in real-time from the computing device to the single-board computer via two distinct communication links or two distinct communication channels. For example, in various embodiments, the code is first delivered from the computing device to the multiplexer, via the first communication link, and then from the multiplexer to the single-board computer, via the second communication link. As a result of using two separate communication links to deliver code from the computing device to the single-board computer, via the multiplexer, embodiments of the present disclosure are not constrained by the physical proximity or persistent physical access requirements of some current methods, as discussed above. For instance, in various examples, the single-board computer may be located in the same or different geographic location as the computing device and yet may be easily and readily programmed using embodiments of the methods disclosed herein. Embodiments of the present disclosure, which provide real-time code delivery from the computing device to the single-board computer, also avoid the time delay associated with some current methods (e.g., using a memory device such as a USB flash drive or an SD card to deliver code to the single-board computer).

Separately, and in addition, embodiments of the present disclosure offer advantages over the existing art with respect to teaching students programming and/or robotics. For example, embodiments of the present disclosure further provide a system and method that facilitates teaching programming and/or robotics to students in a classroom, regardless of whether the classroom is physical or virtual (e.g., remote). In various examples, the multiplexer, discussed above, may be integrated with a learning management system (LMS). By way of example, the LMS may be used to administer delivery of educational content to a student operating a computing device, while also enabling a teacher to monitor and provide feedback to the student. Thus, in some embodiments, a single web-based application may be used both to deliver educational content and to deliver computer code to a single-board computer. For instance, a student may learn programming topics via the LMS portion of the web-based application. In addition, a student may provide computer code via the web-based application and utilize the two distinct communication links, transparent to the student, to deliver code from a student's computing device to a student's single-board computer (e.g., via the multiplexer). As such, a student may readily write and deliver their code to their single-board computer, which in some cases may be embedded with a robotic device. Moreover, in a classroom environment, a student may be able to iteratively modify their code in response to observing the robotic device within a physical space of the classroom (or in response to observing the robotic device at a remote location, for example, via a remote camera). Further, because the LMS and the multiplexer are integrated, the student may learn principles of programming and robotics (e.g., via the LMS) and, without switching applications or platforms, practice what they have learned by writing and delivering code to their single-board computer and/or to their robotic device in real-time by way of the multiplexer and the two distinct communication links. Thus, embodiments of the present disclosure provide for effective integration of teaching programming and/or robotics with a real-time and user-transparent method for code delivery. Various other embodiments and advantages of the present disclosure will become evident in the discussion that follows and with reference to the accompanying figures.

Referring now to FIG. 1A, an embodiment of a system 100, for programming an embedded system, is illustrated. The system 100 includes a user device 102 operated by a first user and a user device 104 operated by a second user. In some embodiments, for example when the first user and/or the second user is a student, the system 100 may also include an instructor device 105 operated by a teacher, a professor, or other type of instructor. In various embodiments, the user devices 102, 104 and the instructor device 105 may include any type of computing device such as a laptop, a desktop, a mobile device, or other appropriate computing device operated by any type of user (e.g., individual, student, instructor, or other type of user). While the embodiments herein are generally shown and described for the sake of clarity with reference to the user devices 102, 104 operated by the first and second users, and with reference to the instructor device 105 operated by an instructor, it will be understood that various embodiments may include any number of user devices and/or instructor devices operated by any number of users and/or instructors at any number of user physical locations. In various examples, the user devices 102, 104 and the instructor device 105 are coupled to a network 106, for example by way of network communication devices, as discussed below.

In various examples, the embodiment of the system 100 further includes a single-board computer 108 and a single-board computer 110. The single-board computers 108, 110 provide a complete set of common computer components integrated onto a single circuit board. For example, in various embodiments, the single-board computers 108, 110 may include a processor, a system on a chip (SoC), a memory, input/output (I/O) interfaces, USB ports, Ethernet ports, wireless networking chips (e.g., such as an IEEE 802.11 chipset), as well as other appropriate features. In some examples, the single-board computer 108 may be embedded within a robotic device 112, and the single-board computer 110 may be embedded within a robotic device 114. Alternatively, in various embodiments, the single-board computers 108, 110 may be embedded within a variety of other devices such as drones, security monitoring devices, medical devices, industrial equipment, or other types of devices. In some embodiments, embedding of the single-board computers 108, 110 is enabled by the small form factor of the single-board computers 108, 110. For instance, in some cases, the single-board computers 108, 110 may have dimensions equal to about 85.6 mm×56.5 mm×17 mm. However, in other embodiments, the single-board computers 108, 110 may have different dimensions. In still other examples, the single-board computers 108, 110 may not be embedded within another device. As discussed in more detail below, the single-board computers 108, 110 may in some embodiments be used for educational purposes, for example, to teach students computer programming. In addition, while the embodiments herein are generally shown and described for the sake of clarity with reference to the single-board computers 108, 110 embedded within the robotic devices 112, 114, respectively, it will be understood that various embodiments may include any number of single-board computers embedded within any number of robotic devices disposed at any number of local or remote physical locations. Further, in various cases, the single-board computers 108, 110 are coupled to the network 106, for example by way of network communication devices, as discussed below.

The system 100 may also include a multiplexing system 116 (e.g., a multiplexer 116). In various embodiments, the multiplexer 116 may be located on a remote server or remote computer. As described in more detail below, the multiplexer 116 serves to mediate communication between the user devices 102, 104 and the single-board computers 108, 110. In some cases, the multiplexer 116 serves to mediate communication between the instructor device 105 and one or both of the single-board computers 108, 110. Stated another way, the multiplexer 116 is an intermediary for communication between the user devices 102, 104 (and in some cases the instructor device 105) and the single-board computers 108, 110. Thus, in various embodiments, the multiplexer 116 may function as a switchboard that routes data between user devices and single-board computers based on, for example, user permissions, Internet connectivity, or other appropriate parameters. In some embodiments, the multiplexer 116 is implemented, for example, as an application that executes on a remote server or remote computer. In some examples, the multiplexer 116 may be integrated with a learning management system (LMS) 118. Thus, in some cases, the LMS 118 may also be implemented as an application that executes on a remote server or remote computer. In some embodiments, the remote server may include, for example, stand-alone and enterprise-class servers operating a server OS such as a MICROSOFT® OS, a UNIX® OS, a LINUX® OS, or other suitable server-based OS. It can be appreciated that the remote server may be deployed in other ways and that the operations performed and/or the services provided by the remote server may be combined or separated for a given implementation and may be performed by a greater number or fewer number of servers. In addition, in some cases, one or more servers may be operated and/or maintained by the same or different entities. In various embodiments, the LMS 118 may be used to administer delivery of educational content to students operating the user devices 102, 104, while also enabling a teacher (e.g., operating the instructor device 105) to monitor and provide feedback to the students. Thus, in some embodiments, the integrated multiplexer 116/LMS 118 may be used both to deliver educational content and to deliver computer code to a single-board computer (e.g., via a single web-based application executing on the user devices 102, 104). Further, the multiplexer 116 is coupled to the network 106, for example by way of network communication devices, as discussed below.

The network 106 of the system 100 may be implemented as a single network or as a combination of multiple networks. For example, in various embodiments, the network 106 may include the Internet and/or one or more intranets, landline networks, wireless networks, cellular networks, satellite networks, and/or other appropriate types of networks. In some examples, the user devices 102, 104 and the instructor device 105 may communicate through the network 106 via cellular communication, by way of one or more user network communication devices. In other examples, the user devices 102, 104 and the instructor device 105 may communicate through the network 106 via wireless communication (e.g., via a WiFi network), by way of one or more user network communication devices. In yet other examples, the user devices 102, 104 and the instructor device 105 may communicate through the network 106 via any of a plurality of other radio and/or telecommunications protocols, by way of one or more user network communication devices. In still other embodiments, the user devices 102, 104 and the instructor device 105 may communicate through the network 106 using a Short Message Service (SMS)-based text message, by way of one or more user network communication devices.

Figure 1B:
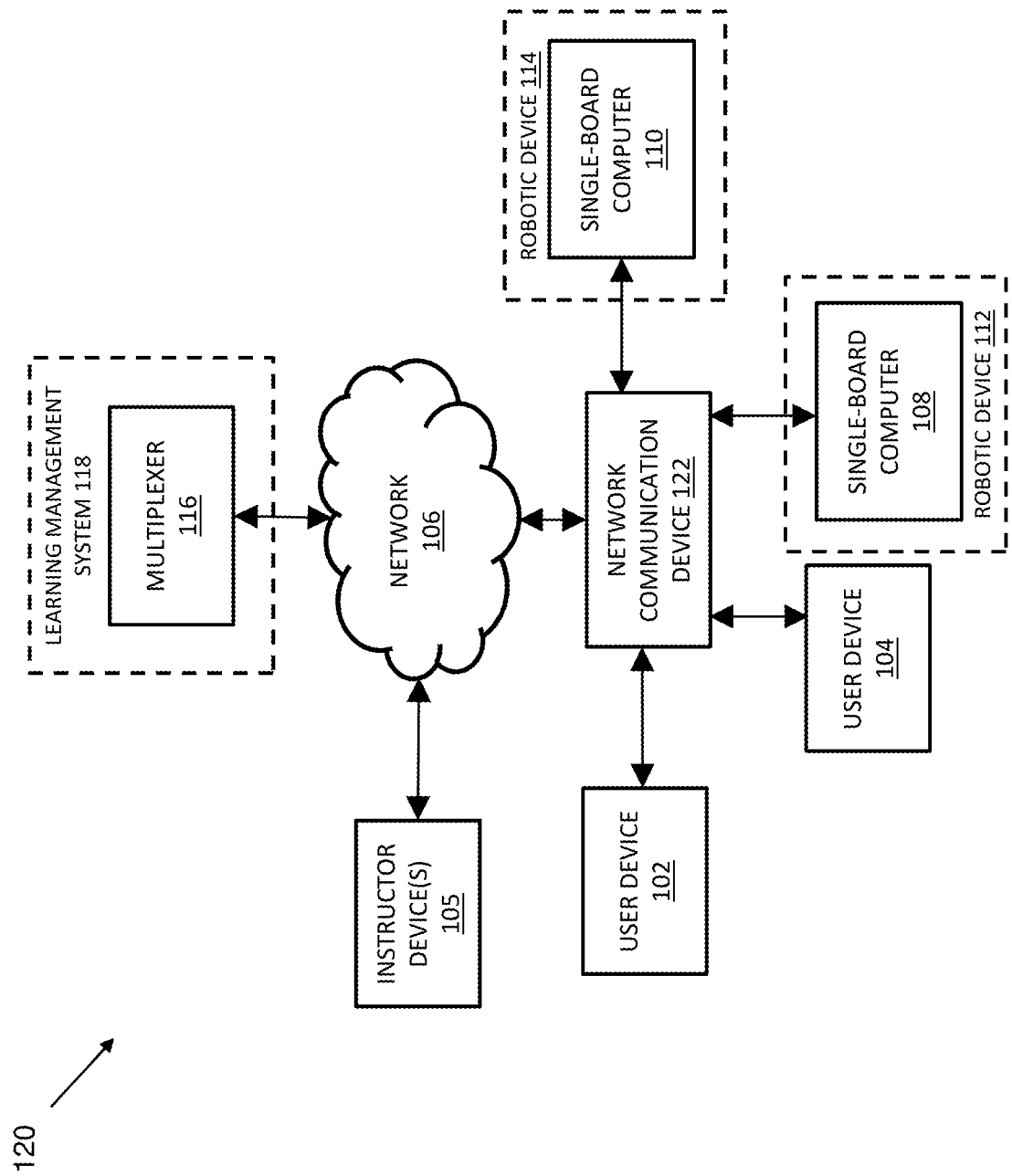
FIG. 1B is a schematic view illustrating an alternative system for programming an embedded system, according to some embodiments.

With reference to FIG. 1B, an embodiment of a system 120, for programming an embedded system, is illustrated. Generally, the system 120 may be substantially the same as the system 100 of FIG. 1A. However, the system 120 of FIG. 1B further illustrates a network communication device 122 that may be used to connect the user devices 102, 104 and the single-board computers 108, 110 to the network 106 (and thus to the multiplexer 116). Thus, the system 120 illustrates an embodiment where the user devices 102, 104 and the single-board computers 108, 110 are connected to the multiplexer 116 using the same network communication device 122. It will be understood that the network communication device 122 is exemplary, and is not mean to be limiting in any way. For instance, the same or another network communication devices may also be used to connect the instructor device 105 to the network 106. Similarly, another network communication device may be used to connect the multiplexer 116 to the network 106. In addition, and in some embodiments, a network communication device (e.g., such as the network communication device 122) may be embedded within one or more of the user devices 102, 104, the single-board computers 108, 110, the instructor device 105, and the multiplexer 116.

Figure 1C:
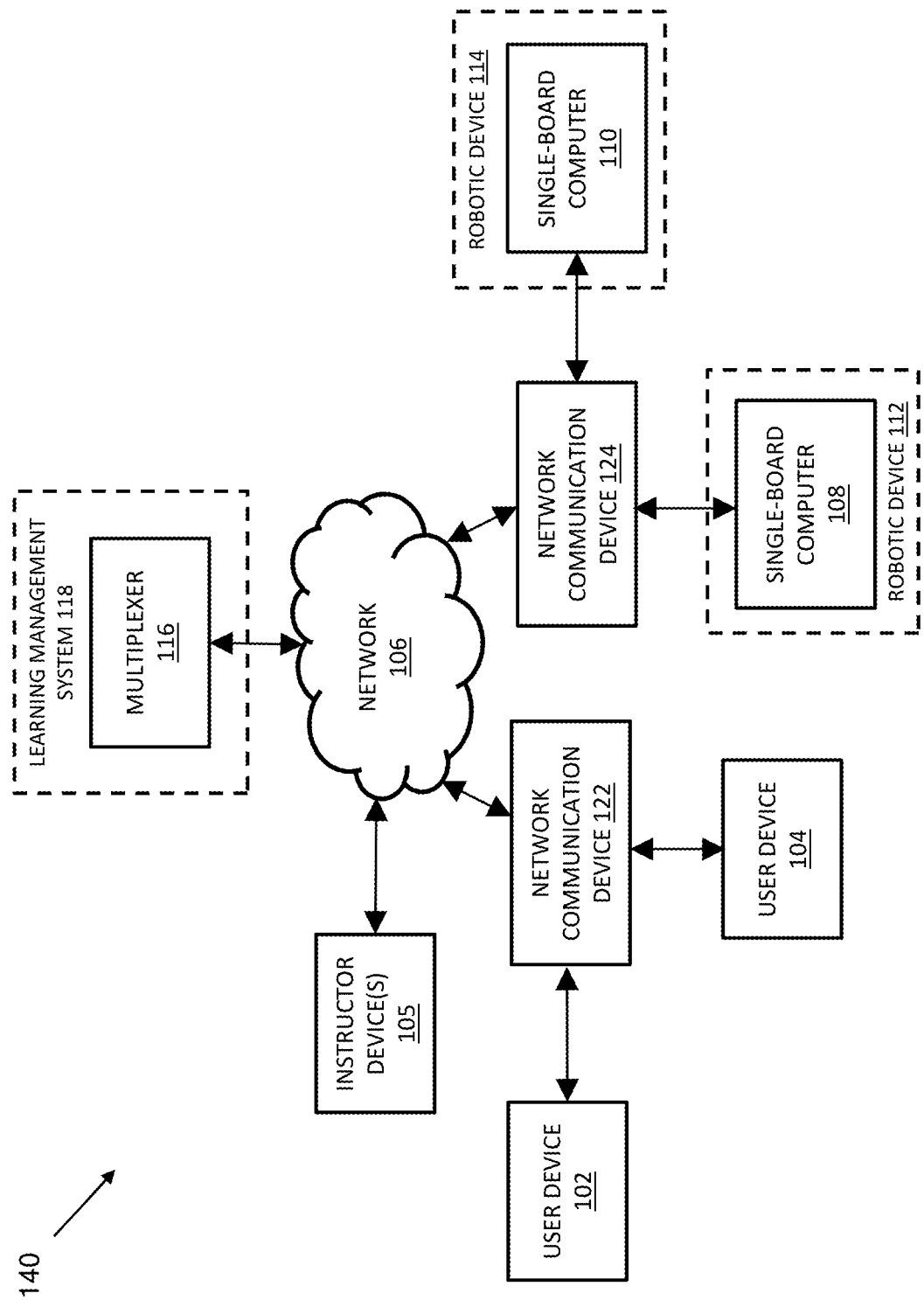
FIG. 1C is a schematic view illustrating another system for programming an embedded system, according to some embodiments.

Referring to FIG. 1C, an embodiment of a system 140, for programming an embedded system, is illustrated. In various aspects, the system 140 may be substantially the same as the system 100 of FIG. 1A or the system 120 of FIG. 1B. However, in addition to the network communication device 122, the system 140 further illustrates a network communication device 124. In some embodiments, the network communication device 122 may be used to connect the user devices 102, 104 to the network 106 (and thus to the multiplexer 116), and the network communication device 124 may be used to connect the single-board computers 108, 110 to the network (and thus to the multiplexer 116). Thus, the system 140 illustrates an embodiment where the user devices 102, 104 and the single-board computers 108, 110 are connected to the multiplexer 116 using different network communication devices 122 and 124. It will be understood that the network communication device 124 is exemplary, and in the same manner as the network communication device 122, is not mean to be limiting in any way.

In general, the user devices 102, 104, the instructor device 105, the single-board computers 108, 110, the network communication devices 122, 124, and/or the multiplexer 116 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the systems 100, 120, 140, and/or accessible over the network 106. In addition, the user devices 102, 104, the instructor device 105, the single-board computers 108, 110, the network communication devices 122, 124, and/or the multiplexer 116 may be implemented using any appropriate combination of hardware and/or software configured for wired and/or wireless communication over the network 106.

In some embodiments, the user devices 102, 104 and/or the instructor device 105 may include one or more browser applications which may be used, for example, to provide a convenient interface to permit the user to browse information available over the network 106. For example, in one embodiment, the browser application may be implemented as a web browser configured to view information available over the Internet. Further, in various embodiments, the web browser may be used to execute and interface with a web-based application that provides for one or more aspects of the present disclosure.

Further, in various examples, the user devices 102, 104 and the instructor device 105 may further include other applications as may be desired in particular embodiments to provide desired features. The other applications may also include security applications for implementing user-side security features, programmatic user applications for interfacing with appropriate application programming interfaces (APIs) over the network 106, or other types of applications. Email and/or text applications may also be included, which allow a user to send and receive emails and/or text messages through the network 106. In some cases, the user devices 102, 104, the instructor device 105, and/or the single-board computers 108, 110 may include one or more user and/or device identifiers which may be implemented, for example, as operating system registry entries, cookies associated with the browser application, identifiers associated with hardware of the user devices 102, 104, the instructor device 105, and/or the single-board computers 108, 110, or other appropriate identifiers. In one embodiment, the identifier may be used to deliver code from a user device to a single-board computer (e.g., through the multiplexer) as further described herein.

Figure 2:
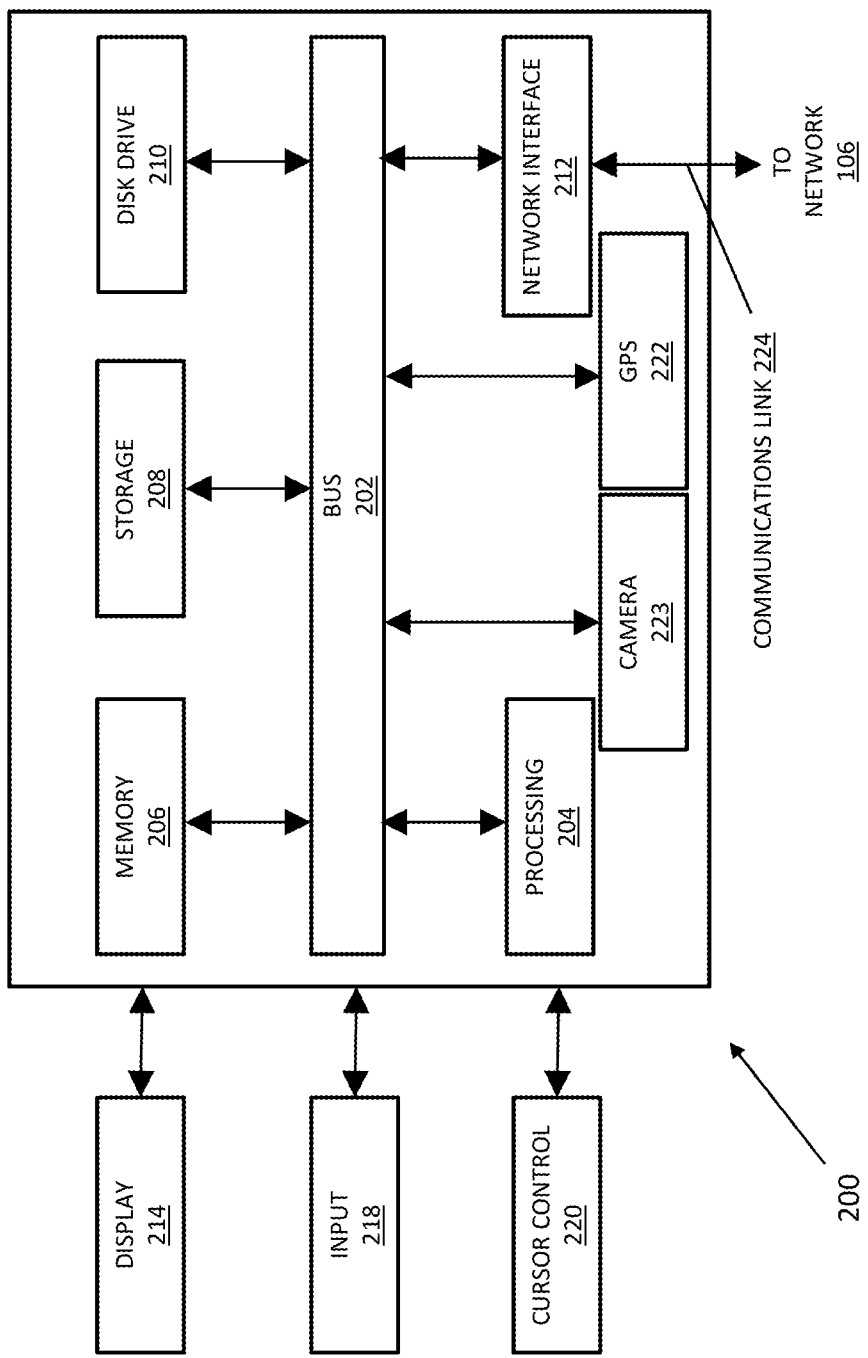
FIG. 2 is a schematic view illustrating an embodiment of a computer system, according to some embodiments.

Elaborating on aspects of at least some of the hardware components, and with reference to FIG. 2, an embodiment of a computer system 200 suitable for implementing, for example, the user devices 102, 104, the instructor device 105, the single-board computers 108, 110, the network communication devices 122, 124, and/or the multiplexer 116, is illustrated. It should be appreciated that other devices utilized by students, instructors, or others, may likewise be implemented as the computer system 200 in a manner as follows.

In accordance with various embodiments, the computer system 200, such as a computer and/or a network server, includes a bus 202 or other communication mechanism for communicating information, which interconnects subsystems and components, such as a processing component 204 (e.g., processor, micro-controller, digital signal processor (DSP), etc.), a system memory component 206 (e.g., RAM), a static storage component 208 (e.g., ROM), a disk drive component 210 (e.g., magnetic, optical, or solid-state), a network interface component 212 (e.g., a modem, an Ethernet card, or an IEEE 802.11 networking component), a display component 214 (e.g., CRT, LCD, or touchscreen), an input component 218 (e.g., keyboard, keypad, or virtual keyboard), a cursor control component 220 (e.g., mouse, pointer, or trackball), a location determination component 222 (e.g., a Global Positioning System (GPS) device as illustrated, a cell tower triangulation device, and/or a variety of other location determination devices known in the art), and/or a camera component 223. In one implementation, the disk drive component 210 may comprise a database having one or more disk drive components. Additionally, in some examples, two or more components of the computer system 200 may be merged into one component that serves the purpose of each of the two or more components (e.g., RAM may be integrated with a solid-state drive in a single, merged component).

In some embodiments, the computer system 200 performs specific operations by the processor 204 executing one or more sequences of instructions contained in the memory component 206, such as described herein with respect to the user devices 102, 104, the instructor device 105, the single-board computers 108, 110, the network communication devices 122, 124, and/or the multiplexer 116. Such instructions may be read into the system memory component 206 from another computer readable medium, such as the static storage component 208 or the disk drive component 210. In other embodiments, hard-wired circuitry may be used in place of or in combination with software instructions to implement the present disclosure.

Logic may be encoded in a computer readable medium, which may refer to any medium that participates in providing instructions to the processor 204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 210, volatile media includes dynamic memory, such as the system memory component 206, and transmission media includes coaxial cables, copper wire, and fiber optics, including wires that comprise the bus 202. In one example, transmission media may take the form of acoustic or light waves, such as those generated during radio wave and infrared data communications.

Some common forms of computer readable media includes, for example, a floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. As discussed above, and in some embodiments, the computer readable media is non-transitory.

In various embodiments, execution of instruction sequences to practice the present disclosure may be performed by the computer system 200. In various other embodiments of the present disclosure, a plurality of the computer systems 200 coupled by a communication link 224 to the network 106 (e.g., such as a LAN, WLAN, PTSN, and/or various other wired or wireless networks, including telecommunications, mobile, and cellular phone networks) may perform instruction sequences to practice the present disclosure in coordination with one another.

The computer system 200 may transmit and receive messages, data, information and instructions, including one or more programs (i.e., application code) through the communication link 224 and the network interface component 212. The network interface component 212 may include an antenna, either separate or integrated, to enable transmission and reception via the communication link 224. Received program code may be executed by processor 204 as received and/or stored in disk drive component 210 or some other non-volatile storage component for execution.

Figure 3A:
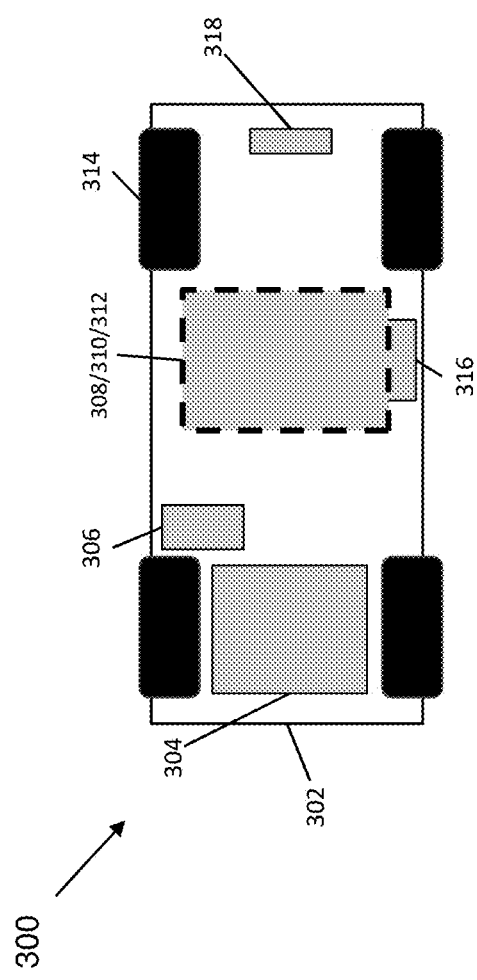
FIGS. 3A and 3B illustrate a top-view and side-view, respectively, of a robotic device, in accordance with some embodiments.
Figure 3B:
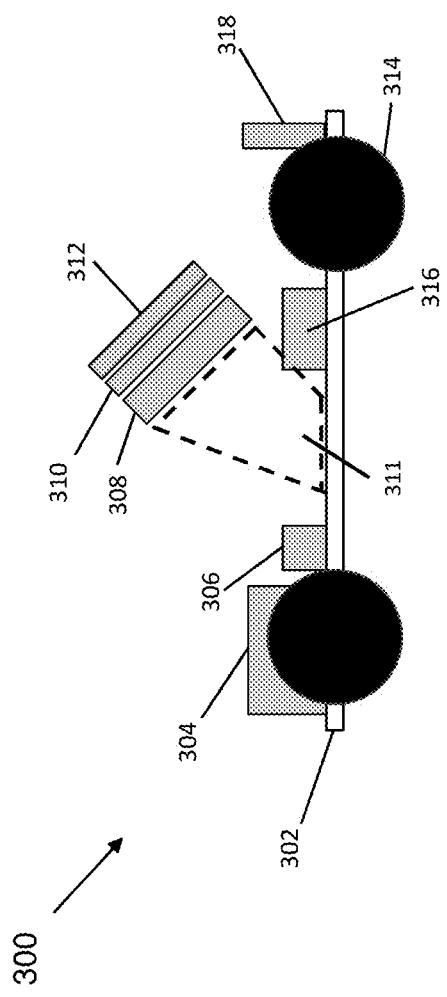

Referring now to FIGS. 3A and 3B, illustrated therein is a top-view and a side-view, respectively, of a robotic device 300. In some embodiments, the robotic device 300 may include the robotic device 112 or the robotic device 114 described above. Thus, the robotic device 300 may include a single-board computer embedded therein. In various examples, the robotic device 300 may have the form of a toy car, as described in more detail below. However the examples of FIGS. 3A and 3B are not meant to be limiting in any way, and in some embodiments, the robotic device 300 may have alternate forms suitable for use as a humanoid robot, industrial robot, service robot, factory robot, military robot, mining robot, drone, security monitoring device, medical device, or other type of device.

As shown in FIGS. 3A and 3B, the robotic device 300 includes a chassis 302, a battery 304, a DC motor 306, a single-board computer 308, a microcontroller 310, a display 312 (e.g., such as an LCD screen or touchscreen LCD screen), wheels 314, a servo motor 316, and a camera 318. In some cases, the camera 318 may be used to scan a quick response (QR) code to automatically connect the robotic device 300 to the Internet. In some embodiments, the robotic device 300 also includes a mount 311 coupled to the chassis 302 that is used to mount the single-board computer 308, the microcontroller 310, and the display 312 in a desired position. For example, in various cases, the robotic device 300 may include a body portion (not shown) disposed on and coupled to the chassis 302. The body portion may generally house and protect various components of the robotic device 300. In some examples, the body portion may include a front-windshield region, where the front-windshield region defines an opening through which the display 312 is visible. Thus, the desired mounting position for the single-board computer 308, the microcontroller 310, and the display 312 may be a position that provides for clear visibility of the display 312 through the front-windshield opening. In various examples, the robotic device 300 may further include other components such as a braking system, a suspension system, additional servo motors, a steering assembly, or other appropriate components.

In some embodiments, the single-board computer 308 includes a Raspberry Pi® single-board computer developed by the Raspberry Pi Foundation. It will be understood, however, that the single-board computer 308 is not limited to any specific type and may include other types of single-board computers such as an Orange Pi SBC, a Banana Pi SBC, an ASUS Tinker Board, a Beagleboard, an Arduino Board, an ODROID-XU4 SBC, or other single-board computer.

In view of the above, the discussion that follows provides exemplary methods for programming an embedded system (e.g., an embedded SBC) and for teaching programming and/or robotics to students in a classroom, in accordance with various embodiments. For clarity of discussion, the methods and illustrative examples that follow may generally be described with reference to a particular type of robotic device (e.g., a toy car), but as previously noted such examples are not meant to be limiting in any way, and in some cases the methods discussed below may be equally applied to other types of robotic devices, without departing from the scope of the present disclosure. With reference now to FIG. 4, an embodiment of a method 400 for programming an embedded system (e.g., an embedded SBC) is illustrated. While some steps of the method 400 may involve direct user input (e.g., via a web browser executing a web-based application), the functionality provided by the systems 100, 120, 140 may not necessarily be visible to a user of the systems 100, 120, 140. One of skill in the art in possession of the present disclosure will recognize that the method 400 may be performed for a plurality of different users operating a variety of different user devices at a variety of physical locations. It will also be understood that additional steps may be performed before, during, and/or after the steps described below with reference to the method 400. In particular, with reference to FIGS. 5-13, various aspects of the method 400 are illustrated and described.

Figure 5:
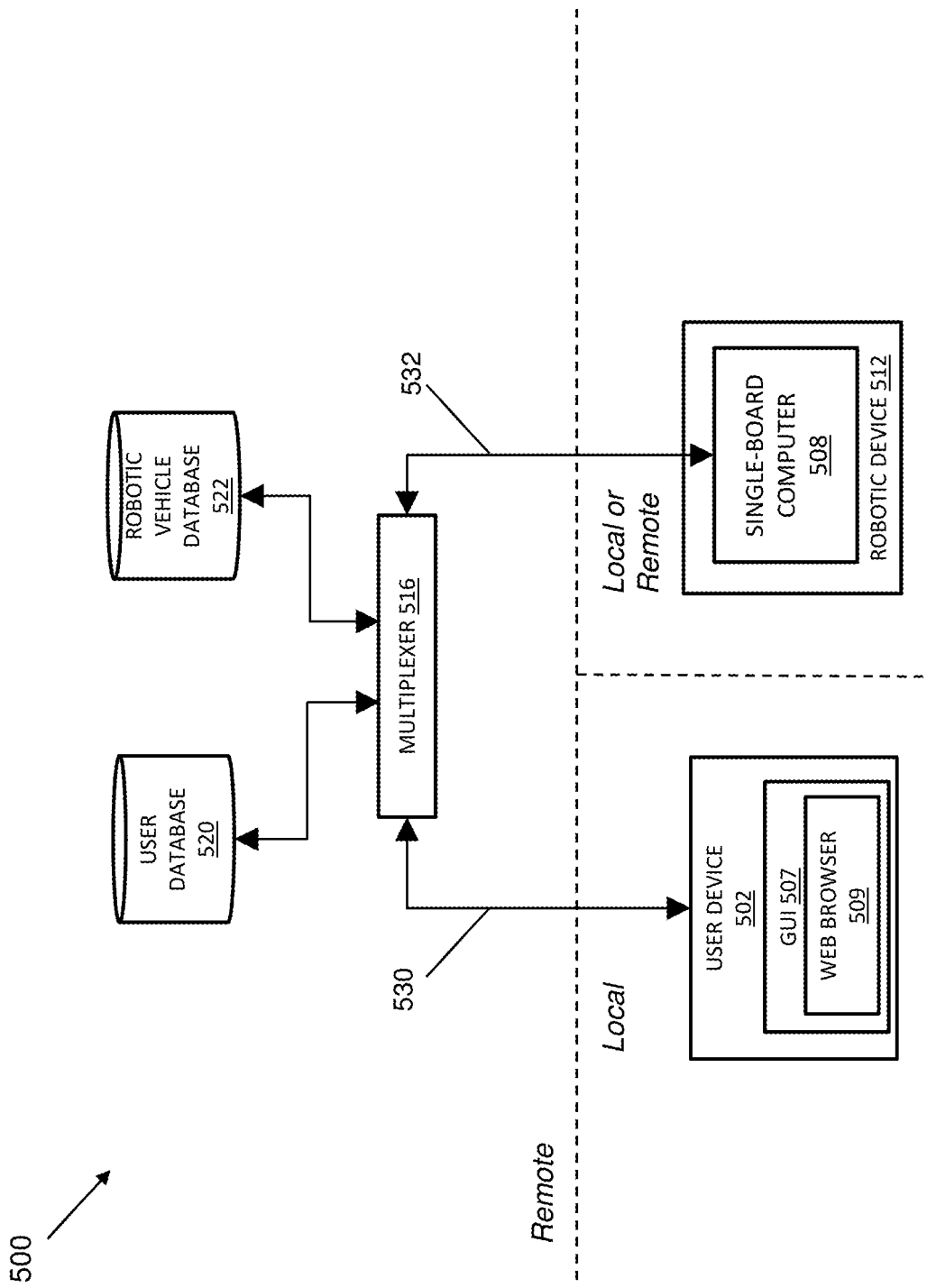
FIG. 5 provides a schematic diagram that illustrates exemplary communication links between a user device, a single-board computer, and a multiplexer, in accordance with some embodiments.

The method 400 begins at block 402 where a user device, a single-board computer, and a multiplexer are connected to a network (e.g., the network 106), a first communication link is established between the user device and the remote multiplexer, and a second communication link is established between the single-board computer and the remote multiplexer. Referring to FIG. 5, illustrated therein is a schematic diagram 500 that illustrates exemplary communication links between a user device 502, a single-board computer 508, and a multiplexer 516, in accordance with some embodiments. In an embodiment of block 402, each of the user device 502, the single-board computer 508, and the multiplexer 516 are connected to and communicate with each other via the network 106 by way of one or more network communication devices. As illustrated, and in at least some embodiments, the user device 502 may be a local device, the single-board computer 508 may be a local or remote device, and the multiplexer 516 may be a remote device. Thus, in some examples, the multiplexer 516 may equivalently be referred to as a remote multiplexer 516. For purposes of this discussion, a "local device" may include a device that is accessible either without a network or via a local area network (LAN), and a "remote device" may include a device that is accessible on a remote server or remote computer (e.g., through an Internet connection). By way of example, the user device 502 may include the user devices 102, 104, the single-board computer 508 may include the single-board computers 108, 110, and the multiplexer 516 may include the multiplexer 116, discussed above. In some examples, the single-board computer 508 may also be embedded within a robotic device 512, where the robotic device 512 may include the robotic device 112, 114, or 300, discussed above.

Still referring to FIG. 5, and in various embodiments, the user device 502 may include a graphical user interface (GUI) 507, where a web browser 509 executing on the user device 502 is displayed via the GUI 507. By way of example, a user operating the user device 502 may open or navigate to a website (e.g., by entering a uniform resource locator (URL) of the website into the web browser 509, by clicking on a hyperlink, or by another suitable method), where navigating to the website may include downloading the website from a web server by the web browser 509 executing on the user device 502. After downloading of the website, the web browser 509 will render the website via the GUI 507 of the user device 502. In some embodiments, the downloaded and rendered website may include a website that provides a web-based application with which the user interfaces and through which the user provides computer code for delivery and execution by the single-board computer 508. Thus, by way of the web-based application and in an embodiment of block 402 of the method 400, a first communication link 530 between the user device 502 and the remote multiplexer 516 is provided. In addition, and in a further embodiment of block 402, once the single-board computer 508 is connected to the network 106, a second communication link 532 between the single-board computer 508 and the multiplexer 516 is provided. In some cases, as part of establishing the first and second communication links, the user device 502 and/or the single-board computer 508 may register with the multiplexer 516. By way of example, registration with the multiplexer 516 may include providing an identifier to the multiplexer 516. In some embodiments, the user device 502 may provide a first identifier to the multiplexer 516, where the first identifier identifies the user device 502. Similarly, in some cases, the single-board computer 508 may provide a second identifier to the multiplexer 516, where the second identifier identifies the single-board computer 508. In some examples, the first and second identifiers may include operating system registry entries, cookies associated with the website that provides the web-based application, identifiers associated with hardware of the user device 502 and/or the single-board computer 508, or other appropriate identifiers. Alternatively, as part of the registration process, the multiplexer 516 may generate and assign an identifier to each of the user device 502 and the single-board computer 508. Regardless of how the identifiers are provided, the identifiers may be used, for example, to deliver code from a particular user device to a single-board computer specified by the single-board computer identifier (e.g., second identifier) and/or to send data from the single-board computer to the particular user device specified by the user device identifier (e.g., first identifier). Separately, and in addition, since the multiplexer 516 may be integrated with a learning management system (LMS), as described in more detail below, the web-based application may also be used to deliver educational content to a student via an LMS portion of the web-based application.

Figure 6:
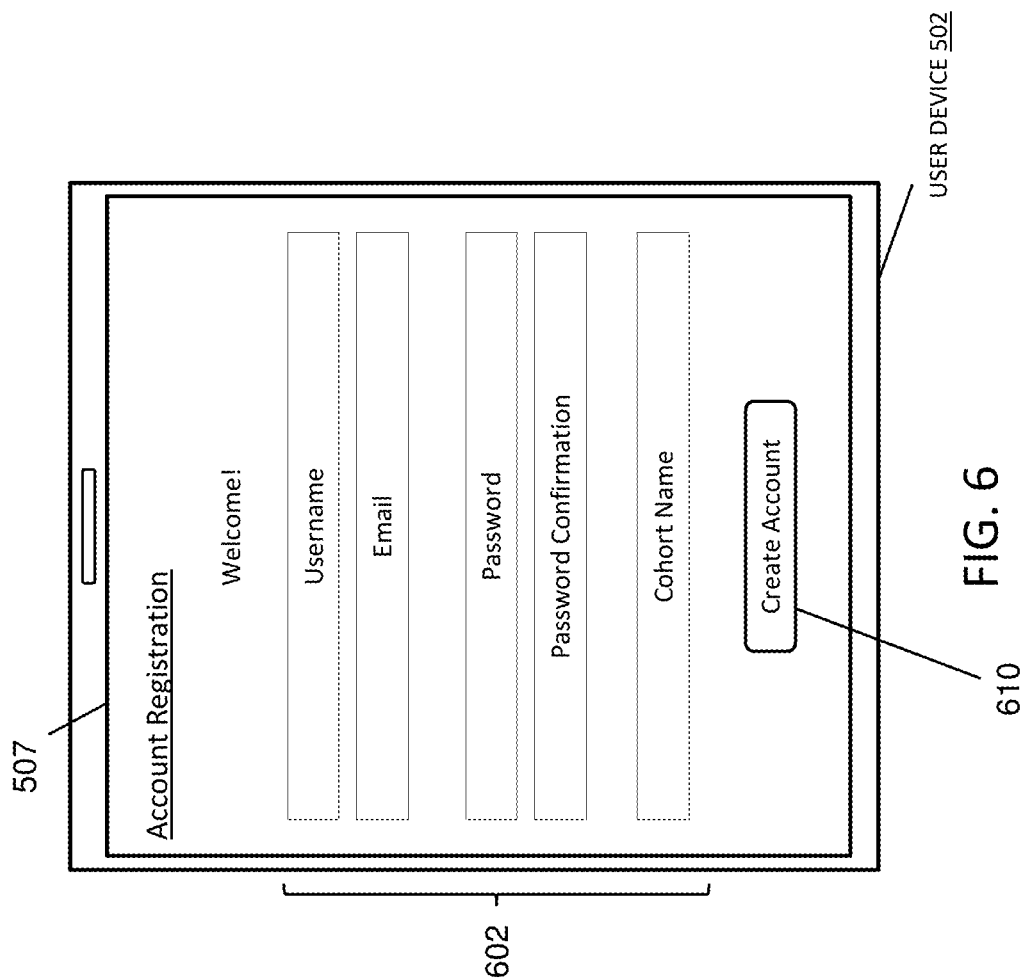
FIG. 6 illustrates an embodiment of a user device including a screen shot of a web-based application displaying an account creation screen.

In some embodiments, prior to utilizing and/or interacting with the various features of the web-based application, a user account may be created. Referring to FIG. 6, the user device 502 is illustrated that includes the GUI 507 and which may include a touchscreen user interface. The user device 502, in accordance with various embodiments of the present disclosure, may include a laptop computer, a desktop computer, a mobile phone, a tablet, and/or any of a variety of other type of computing device as known in the art. In various embodiments, a user associated with the user device 502 may launch the web-based application, for example, to request creation of a user account and/or to update, view, or otherwise interact with a previously created user account. In some embodiments, and with reference to FIG. 6, upon launching the web-based application, the user may be presented with an "Account Registration" screen, as shown in the GUI 507. In various examples, a user may be prompted to enter authentication information 602 (e.g., a username, email address, password, and/or cohort name). After entering the authentication information 602, the user may select a "Create Account" button 610. Upon selecting the "Create Account" button 610, the authentication information 602 entered by the user may be used to create the user account. Thus, the user account may be associated with the user operating user device 502. In some embodiments, the user information, such as the authentication information 602, may be stored in a user database 520 (FIG. 5) that is accessible to the multiplexer 516. In some cases, the user database 520 may additionally store other user account information, user preference information, and/or account configuration information, among other information. As also shown in FIG. 5, a robotic vehicle database 522, which may be used to store information associated with the single-board computer 508 and/or the robotic device 512 within which the single-board computer 508 is embedded, may also be provided.

The method 400 proceeds to block 404 where the user device is paired with the single-board computer. For purposes of this discussion, "pairing" is a process by which the single-board computer 508 is associated with the user device 502. More particularly, in some embodiment, pairing may include associating the single-board computer 508 with a user account of a user operating the user device 502. Generally, and in various embodiments, the pairing process is managed and/or implemented by the remote multiplexer 516. As discussed in more detail below and based on the pairing process, the remote multiplexer 516 may enforce rules as to which user devices may communicate with which single-board computers. Stated another way, the remote multiplexer 516 may ensure that a user device can send data only to a single-board computer to which it is paired, and vice-versa. In some cases, if the remote multiplexer 516 receives data from a user device that is not paired to a single-board computer, or from a single-board computer that is not paired to a user device, then the remote multiplexer 516 may simply discard the received data. Thus, the pairing process may alternatively be thought of as a process for granting permission to a user device and a single-board computer to communicate with each other through the remote multiplexer.

Figure 7:
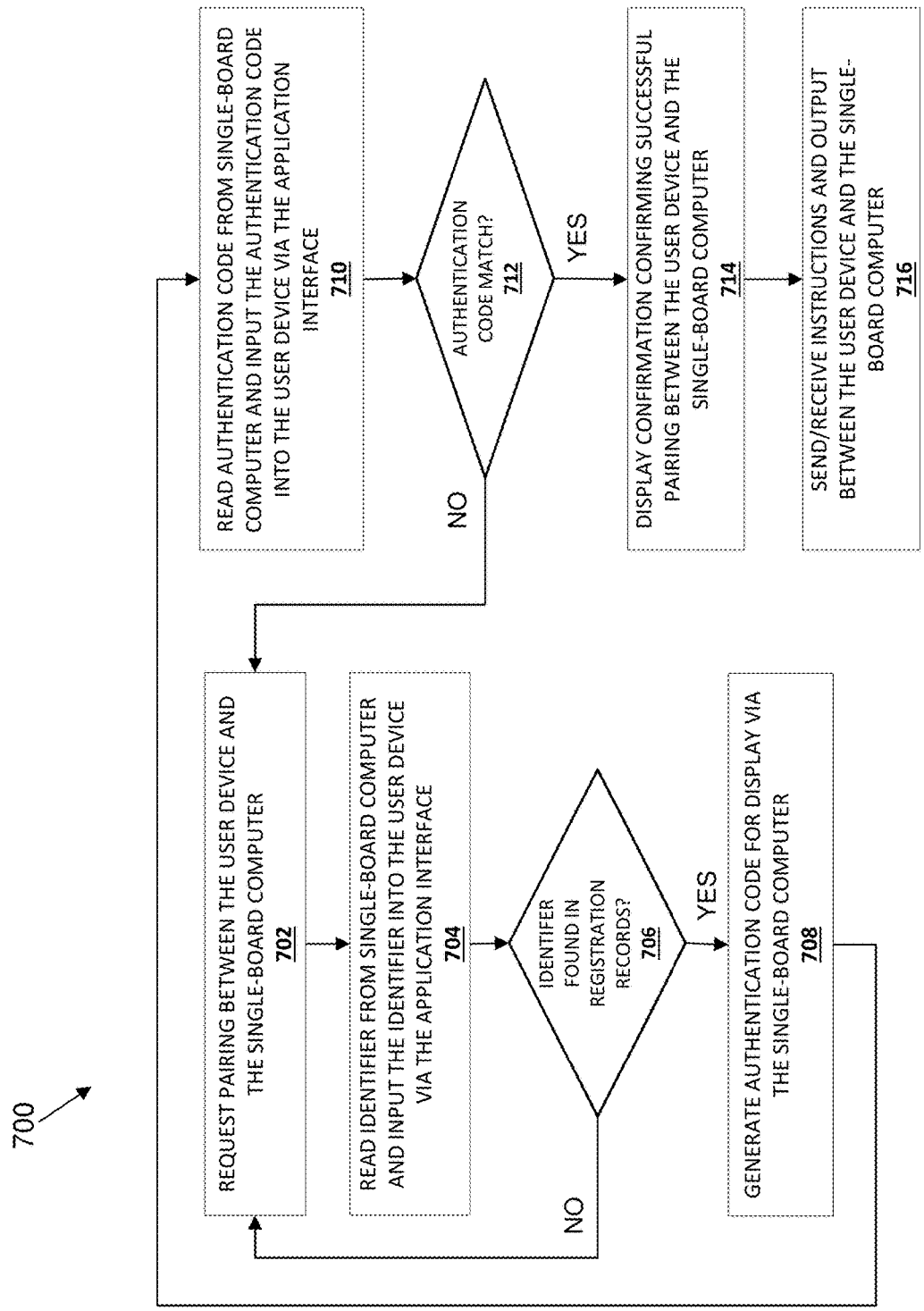
FIG. 7 is a flow chart illustrating an embodiment of a method for pairing a user device and a single-board computer.

To provide a more detailed description of the pairing process (block 404 of the method 400), reference is now made to FIG. 7, which illustrates an embodiment of a method 700 for pairing a user device and a single-board computer. It will also be understood that additional steps may be performed before, during, and/or after the steps described below with reference to the method 700. In particular, with reference to FIGS. 8-13, various aspects of the method 700 are illustrated and described.

Figure 8:
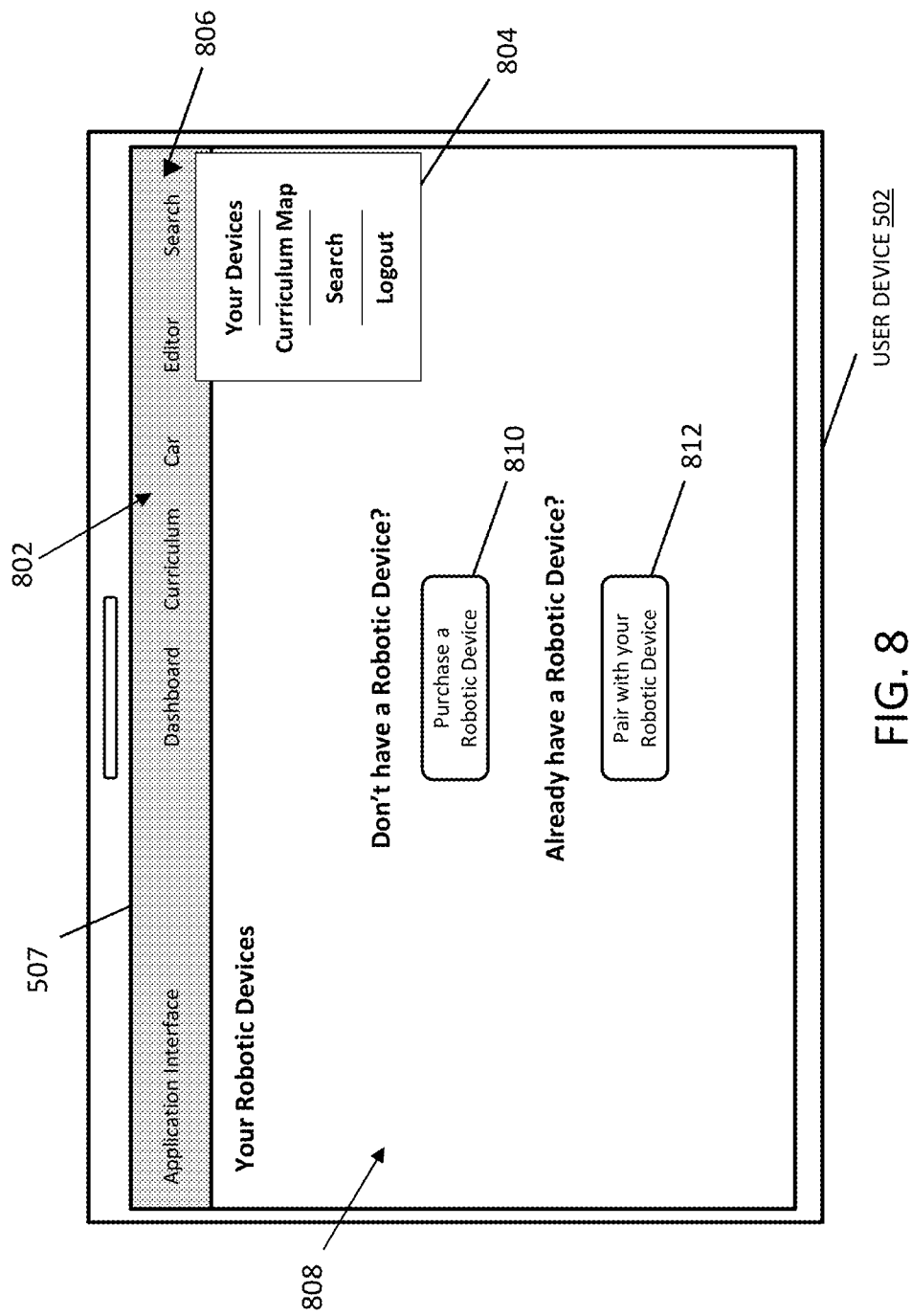
FIGS. 8, 9, 10, 11, 12, and 13 illustrate screen shots of the web-based application at various stages of the method of FIG. 7.

The method 700 begins at block 702 where a request to pair a user device and a single-board computer is received. With reference to FIG. 8, and in an embodiment of block 702, the user device 502 including the GUI 507 and showing an example of an application interface of the web-based application, discussed above, is illustrated. As shown, the application interface may include a menu bar 802 having a variety of menu options such as "Dashboard", "Curriculum", "Car", "Editor", and "Search". While some examples of menu options have been given, it will be understood that menu options may be added or removed, and other types of menu options may be used, without departing from the scope of the present disclosure. As discussed in more detail below, and in some embodiments, the "Curriculum" menu option may provide user-access to an LMS portion of the web-based application, where a student may learn programming topics. Similarly, in some examples, the "Editor" menu option may provide user-access to another portion of the web-based application where a user may provide computer code for delivery from the user device 502 to the single-board computer 508 (e.g., via the remote multiplexer 516). In some embodiments, the application interface further includes a drop-down menu 804 that may be accessible to a user, for example, by clicking on a drop-down menu icon 806. The drop-down menu 804 may include a variety of menu options such as "Your Devices", "Curriculum Map", "Search", and "Logout". Similar to the menu bar 802, it will be understood that the menu options of the drop-down menu 804 are merely exemplary, menu options may be added or removed, and other types of menu options may be used, without departing from the scope of the present disclosure.

In some embodiments, a user that would like to pair a user device (e.g., such as the user device 502) with a single-board computer (e.g., such as the single-board computer 508) may initially click on "Your Devices" from the drop-down menu 804. Responsive to clicking on "Your Devices", a window 808 of the web-based application interface may be displayed via the GUI 507. As illustrated in the window 808, users that do not yet have a robotic device (and embedded SBC) may select a button 810 that provides the user with one or more options to purchase a robotic device. Alternatively, for users that do already have a robotic device (and embedded SBC), the user may select a button 812 to initiate the request to pair the user device (e.g., such as the user device 502) and the single-board computer (e.g., such as the single-board computer 508).

Figure 9:
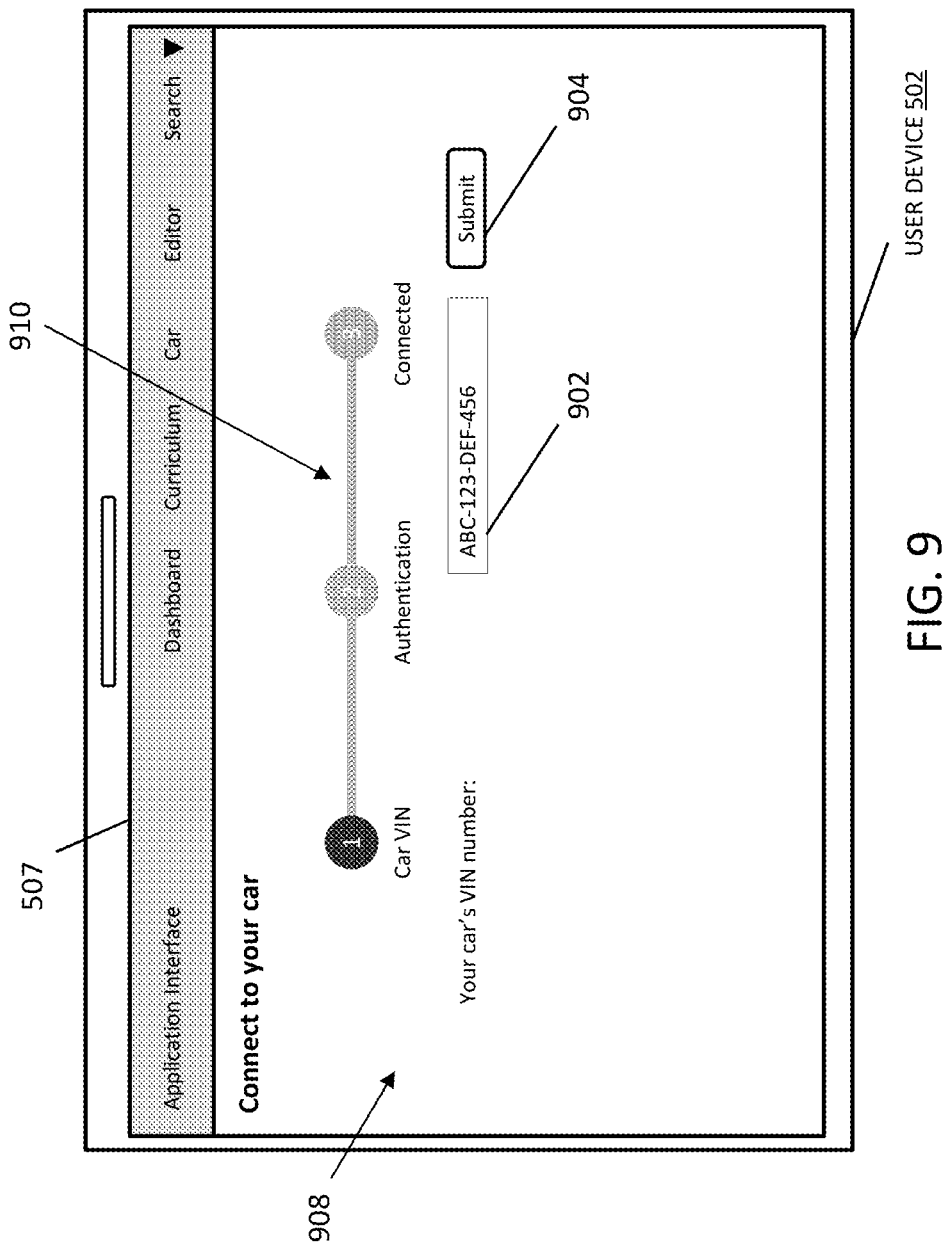

The method 700 proceeds to block 704 where an identifier is read from the single-board computer and entered into the user device via the web-based application interface. With reference to FIGS. 8 and 9, and in an embodiment of block 704, responsive to selecting the button 812 to initiate the pairing request, a window 908 of the web-based application interface may be displayed via the GUI 507. In some cases, the window 908 may include a progress bar 910 to indicate a current step of the pairing process. As illustrated in the window 908, a first step of the pairing process includes reading an identifier from the single-board computer 508 (e.g., read from the display 312 mounted to the robotic device 300). In some embodiments, the identifier includes a vehicle identification number (VIN). Alternatively, in some examples, the identifier may include another appropriate identifier associated with the single-board computer 508 or robotic device 512 within which the single-board computer is embedded. For purposes of this discussion, we may assume that a VIN is read from the single-board computer 508 and input into a field 902 of the web-based application interface. After entering the VIN into the field 902, the user may select a button 904 to submit the identifier (e.g., the VIN) to the remote multiplexer 516. It will be understood that in some embodiments, the single-board computer 508 may be local to the user (e.g., in the same physical location), and thus the user may readily read the VIN from the display 312 of the single-board computer 508. However, in some examples, the single-board computer 508 (and the robotic device 512) may instead be located at a remote physical location with respect to the user. In the example where the single-board computer 508 is located at a remote location, the user may alternatively retrieve the VIN by speaking to, texting with, or otherwise communicating with an individual that is also at the remote physical location. In yet other embodiments, when the single-board computer 508 is located at a remote location, the user may read the VIN from the display 312 of the single-board computer 508 by way of an appropriately configured remote camera that is also connected to the network 106.

The method 700 proceeds to block 706 where the identifier input into the web-based application interface is searched for within a set of registration records. For example, as part of the registration process, discussed above, an identifier (e.g., such as a VIN or other identifier) associated with the single-board computer 508 (or robotic device 512) may be stored within the robotic vehicle database 522 (FIG. 5) as part of a registration record for a given single-board computer or robotic device. By way of example, the remote multiplexer 516, which has access to the robotic vehicle database 522, may search the registration records for the identifier. In some embodiments, if the identifier is not found within the registration records (at block 706), then the method 700 may proceed to block 702, where the request to pair the user device and the single-board computer may once again be initiated, as discussed above. Alternatively, in various examples, if the identifier is found within the registration records (at block 706), then the method 700 may instead proceed to block 708, where an authentication code is generated (e.g., by the remote multiplexer 516) and displayed via the single-board computer (e.g., via the display 312 mounted to the robotic device 300). In some embodiments, the generated authentication code may include a randomly-generated alphanumeric code or other appropriate authentication code. In various embodiments, the authentication code generated by the remote multiplexer 516 may be referred to as a "known authentication code".

Figure 10:
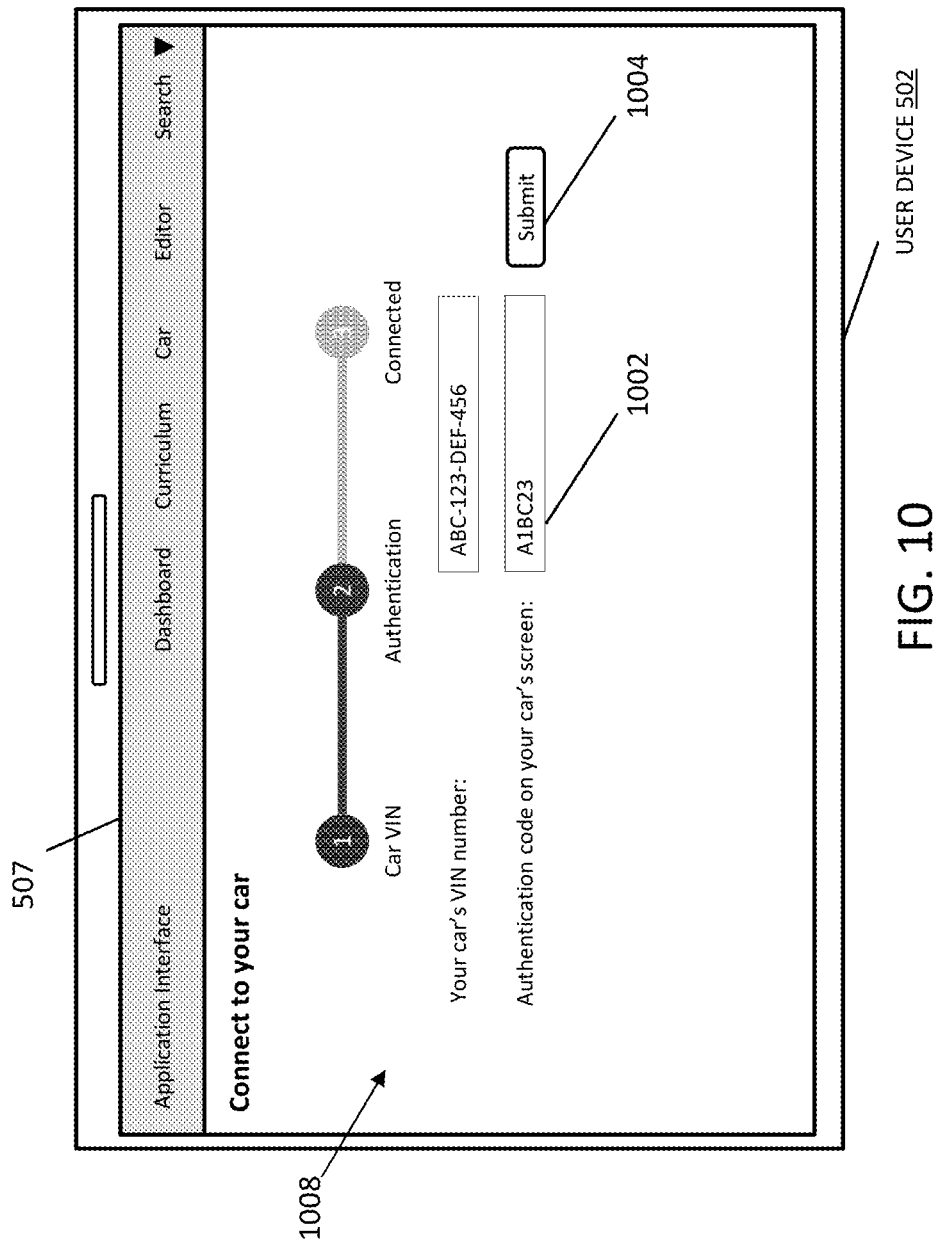
Figure 11:
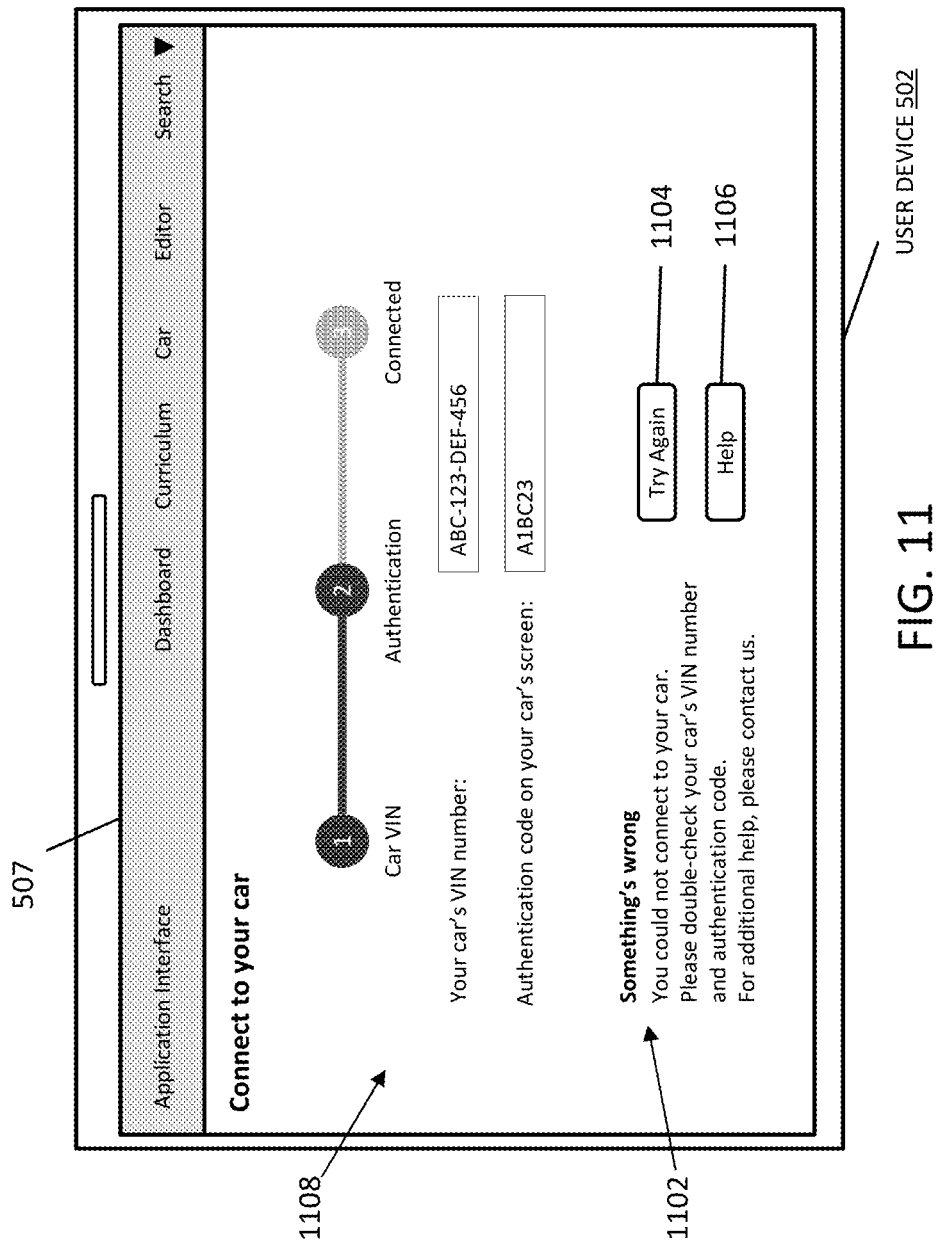
Figure 12:
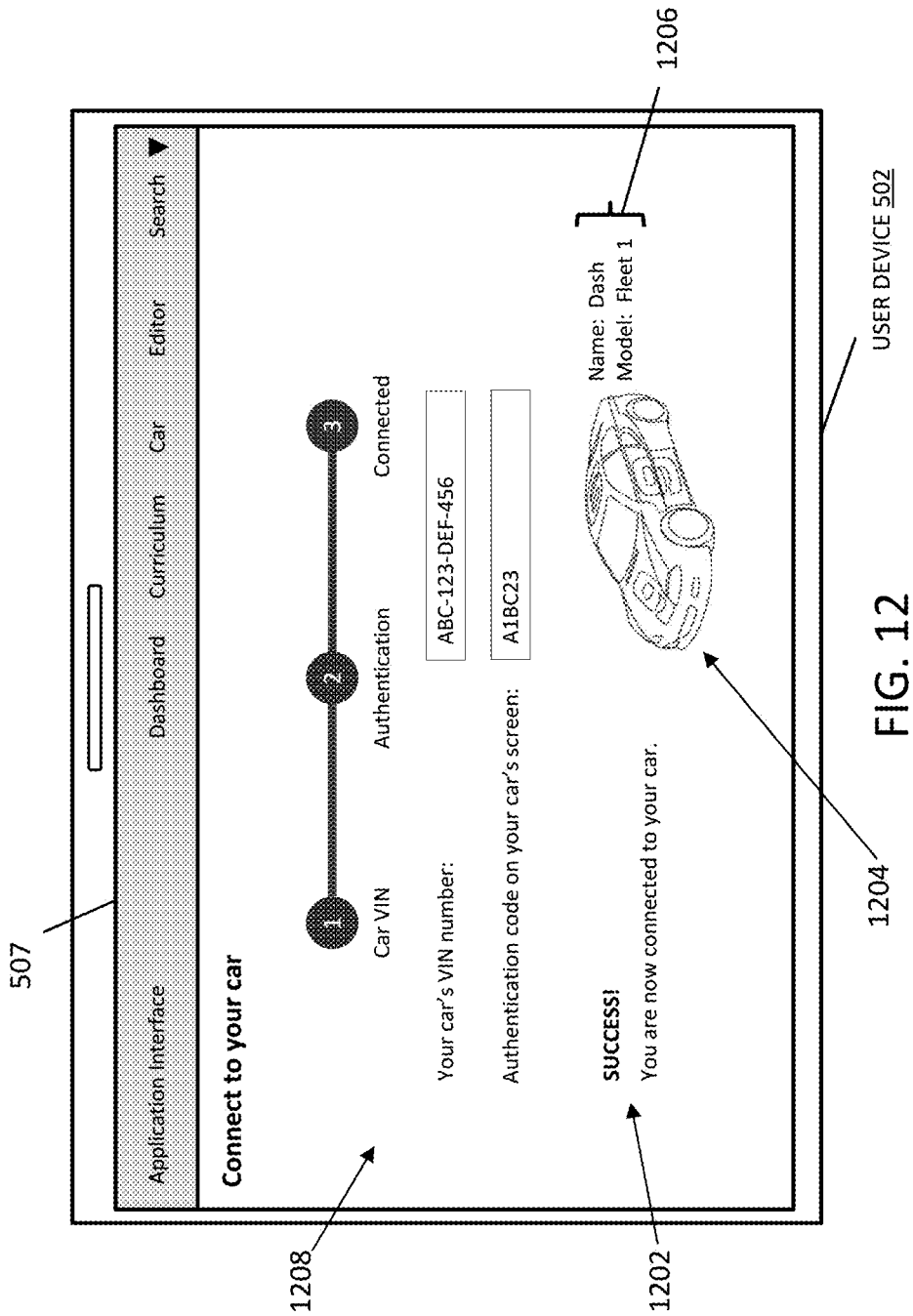

After generation and display of the authentication code (block 708), method 700 proceeds to block 710 where the authentication code is read from the single-board computer and entered into the user device via the web-based application interface. With reference to FIGS. 9 and 10, and in an embodiment of block 710, responsive to selecting the button 904 (including searching for and finding the identifier within the registration records), a window 1008 of the web-based application interface may be displayed via the GUI 507, and the generated authentication code is displayed via the single-board computer (e.g., via the display 312 mounted to the robotic device 300). Then, as illustrated in the window 1008 and in an embodiment of block 710, the pairing process further includes reading the identifier from the single-board computer 508 (e.g., read from the display 312 mounted to the robotic device 300). As mentioned above, the authentication code may include a randomly-generated alphanumeric code or other appropriate authentication code. In some examples, the authentication code may be read from the single-board computer 508 and input into a field 1002 of the web-based application interface. After entering the authentication code into the field 1002, the user may select a button 1004 to submit the authentication code to the remote multiplexer 516. As discussed above, and in some cases, the single-board computer 508 may be local to the user (e.g., in the same physical location), and thus the user may readily read the authentication code from the display 312 of the single-board computer 508. However, in some examples, the single-board computer 508 (and the robotic device 512) may instead be located at a remote physical location with respect to the user. In the example where the single-board computer 508 is located at a remote location, the user may alternatively retrieve the authentication code by speaking to, texting with, or otherwise communicating with an individual that is also at the remote physical location. In yet other embodiments, when the single-board computer 508 is located at a remote location, the user may read the authentication code from the display 312 of the single-board computer 508 by way of an appropriately configured remote camera that is also connected to the network 106.

The method 700 proceeds to block 712 where the authentication code input into the web-based application interface is compared (e.g., by the remote multiplexer 516) to the authentication code previously generated by the remote multiplexer 516 (e.g., the known authentication code). In some examples, the authentication code generated by the remote multiplexer 516 may be stored within the robotic vehicle database 522, within the user database 520, or within another memory location accessible to the remote multiplexer 516. Thus, the remote multiplexer 516 may readily compare the authentication code input into the web-based application interface to the known authentication code stored at the memory location accessible to the remote multiplexer 516. In some embodiments, if the authentication code input into the web-based application interface does not match the known authentication code (at block 712), then the method 700 may proceed to block 702, where the user may once again request to pair the user device 502 and a single-board computer 508, as discussed above. In addition, if the authentication code does not match (at block 712) and with reference to FIG. 11, a window 1108 of the web-based application interface may be displayed via the GUI 507, where the window 1108 displays an error message 1102 indicating that the pairing was unsuccessful. In some embodiments, the window 1108 may further include a button 1104 to retry the pairing process. In some cases, selection of the button 1104 may initiate the method 700 returning to the block 702. Further, in some examples, the window 1108 may also include a help button 1106, which the user may select to request help with the pairing process or with other aspects of the web-based application. In some examples, selecting the help button 1106 may provide access to electronic help resources, a chat window to chat with an advisor, or a phone number which the user may call for assistance, among other forms of assistance. Alternatively, in various examples, if the authentication code does match the known authentication code (at block 712), then the method 700 may instead proceed to block 714, where a successful pairing confirmation is generated (e.g., by the remote multiplexer 516) and displayed via the single-board computer (e.g., via the display 312 mounted to the robotic device 300). Further, if the authentication code does match (at block 712) and with reference to FIG. 12, a window 1208 of the web-based application interface may be displayed via the GUI 507, where the window 1208 displays a message 1202 indicating the successful pairing. In some embodiments, the window 1208 may further include an image 1204 of the paired robotic device (e.g., such as a toy car) that includes an embedded SBC and information 1206 about the paired robotic device (e.g., such as a name, model, or other pertinent information).

In various embodiments, the remote multiplexer 516 may store pairing data (e.g., within the robotic vehicle database 522), where the pairing data indicates which particular user device and which particular single-board computer have been successfully paired with each other to define a user device-SBC pair. For instance, in the present example, the pairing data may indicate a user device-SBC pair that includes the user device 502 and the single-board computer 508. In some examples, the pairing data (e.g., stored in the robotic vehicle database 522) allows for one or both of the user device 502 and the single-board computer 508 to be powered OFF while the pairing data remains intact. Thus, when the user device 502 and the single-board computer 508 are next powered ON and connected to the remote multiplexer 516 (e.g., through an Internet connection) as discussed above, the remote multiplexer 516 may access the pairing data via the robotic vehicle database 522 and automatically re-establish the pairing between the user device 502 and the single-board computer 508. As such, in various embodiments, a user device and a single-board computer may be proactively paired once by a user (e.g., as provided by the method 700), with subsequent pairings automatically handled by the remote multiplexer 516 having access to the previously stored pairing data.

After confirmation of successful pairing between a user device and a single-board computer (block 714), the method 700 proceeds to block 716 where data and/or instructions (including code) may now be sent and/or received between the paired user device and the single-board computer. As merely one example, and after successful pairing, a user may select the "Editor" menu option from the menu bar 802. As discussed above, the "Editor" menu option may provide user-access to another portion of the web-based application where a user may provide computer code for delivery from the user device 502 to the single-board computer 508 (e.g., via the remote multiplexer 516) or where the user may select code stored within one of the user database 520 and the robotic vehicle database 522, accessible by the remote multiplexer 516, for delivery to the single-board computer 508. By way of illustration, after selecting the "Editor" menu option, and with reference to FIG. 13, a window 1308 of the web-based application interface may be displayed via the GUI 507, where the window 1308 provides a terminal window 1302, for example, for writing and/or editing code. In some cases, a user may alternatively load pre-written code from a memory device (e.g., such as a USB flash drive or an SD card) onto the user device 502. In some embodiments, the loaded and pre-written code may be displayed and optionally edited via the terminal window 1302. In various examples, the window 1308 may further include a run code button 1304 that may be used to initiate delivery of the code (e.g., within the terminal window 1302) to the single-board computer 508 via the remote multiplexer 516. In some embodiments, the window 1308 may also include a camera window 1306 that may be used to display images and/or video captured by the camera 318 (FIGS. 3A and 3B) of the robotic device 300. The window 1308 may also include a button 1310 that is used to toggle the camera 318 between an ON-state and an OFF-state. In some embodiments, the window 1308 may further include the image 1204 of the paired robotic device, the information 1206 about the paired robotic device, a list of features 1312 of the robotic device (e.g., voice commands, sonar, camera, LIDAR, or other features), a list of capabilities 1314 of the robotic device (e.g., proximity detection, SAE Autonomy Level 1, or other capabilities), an indication 1316 as to whether a software and/or firmware update is available (e.g., for the user device 502 and/or the single-board computer 508) for download (e.g., via one of the user database 520 and the robotic vehicle database 522), and a battery level 1318 of the robotic device. In some embodiments, a button 1320 may also be provided to allow the user to select a different robotic device (e.g., a different toy car) with which to pair the user device 502. While some examples of various features of the window 1308 have been given, it will be understood that the illustrated features are merely exemplary, and features may be added or removed, without departing from the scope of the present disclosure.

Figure 13:
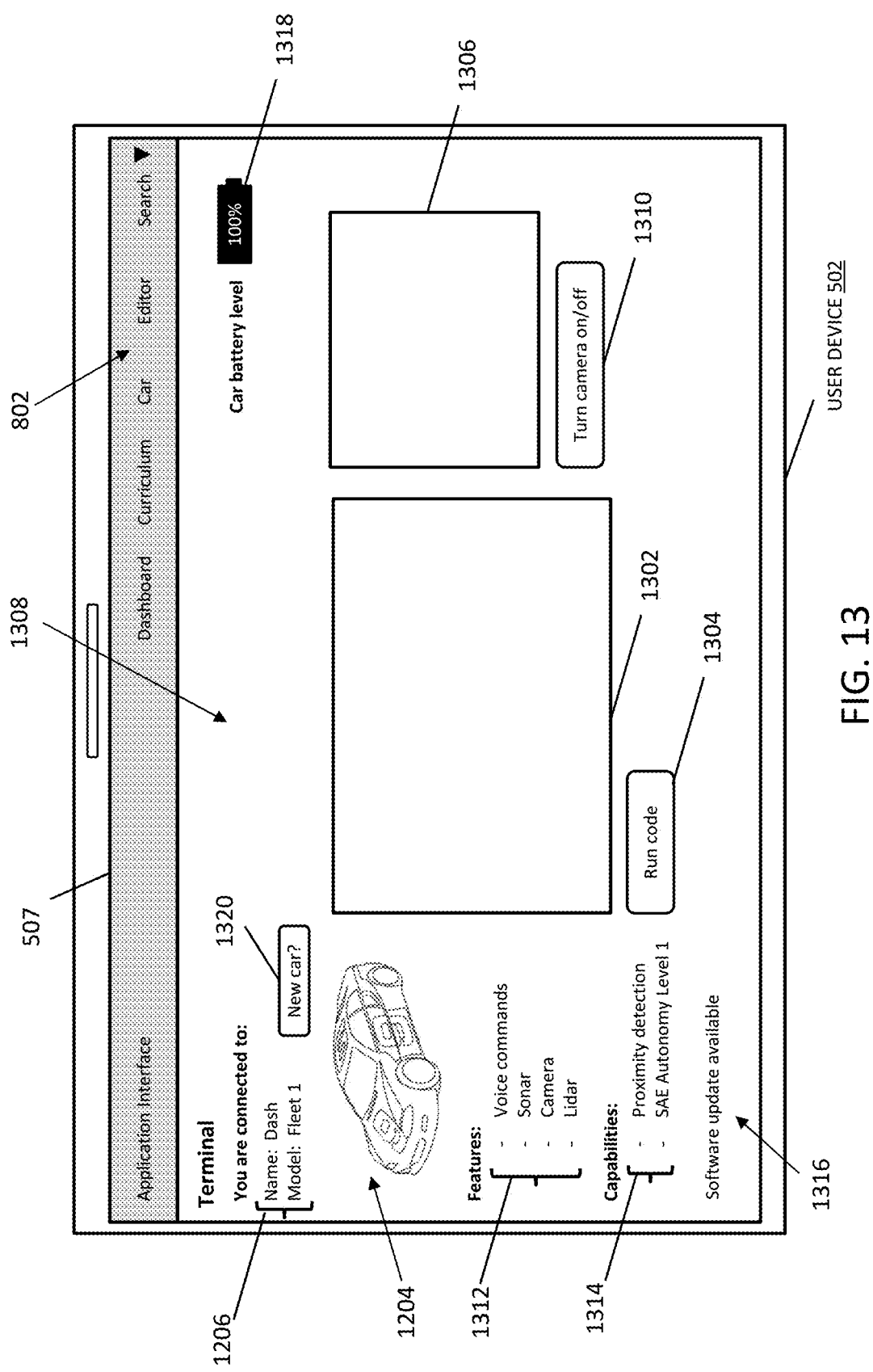

Returning now to the method 400 (FIG. 4), and once pairing between the user device and the single-board computer is complete (e.g., with reference to block 404 of the method 400, and in accordance with the method 700), the method 400 then proceeds to block 406 where instructions for operating the single-board computer are received at the remote multiplexer from a web browser executing on the user device. With reference to FIGS. 5 and 13, and in an embodiment of block 406, a user operating the user device 502 may utilize the user device to write, load, or modify computer code for subsequent delivery and execution in real-time on the paired single-board computer 508. In some embodiments, the user may write and/or edit code within the terminal window 1302, or the user may load pre-written code from a memory device (e.g., such as a USB flash drive or an SD card) onto the user device 502, where the pre-written code may be displayed and optionally edited via the terminal window 1302. Thereafter, in various embodiments, the user operating the user device 502 may select the run code button 1304 to initiate delivery of the code (e.g., within the terminal window 1302) to the single-board computer 508 via the remote multiplexer 516. In particular, in some examples, after selecting the run code button 1304, the web-based application may send the code to the remote multiplexer 516 via a first communication link 530 or first communication channel (e.g., through the network 106). In some embodiments, the web-based application may also send a first identifier that identifies the user device 502 and a second identifier that identifies the single-board computer 508 with which the user device 502 is paired. Stated another way, the web-based application provides the second identifier to the remote multiplexer 516 to identify the particular single-board computer that is to receive and execute the transmitted code. As previously noted, in various embodiments, the user device 502 and the single-board computer 508 may have previously registered with the remote multiplexer 516 and assigned unique identifiers. Thus, the second identifier provided to the remote multiplexer 516 by the web-based application may include an identifier assigned during the registration process. If, in certain cases, the web-based application provides an identifier for a single-board computer with which the user device 502 is not paired, then the remote multiplexer 516 may disregard a request to deliver code to the non-paired single-board computer.

The method 400 then proceeds to block 408 where the instructions for operating the single-board computer are transmitted from the remote multiplexer to the single-board computer identified by the second identifier. With reference to FIG. 5, and in an embodiment of block 408, the code received at the remote multiplexer 516 may be forwarded to the single-board computer 508 identified by the second identifier (e.g., the single-board computer 508 with which the user device 502 is paired) via a second communication link 532 or second communication channel (e.g., through the network 106). In some embodiments, the remote multiplexer 516 may also forward the first identifier to the single-board computer 508 that identifies the user device 502 from which the received code originated. In various examples, and as described above, the single-board computer 508 may include a complete set of common computer components integrated onto a single circuit board (e.g., such as a processor, memory, I/O interfaces, and/or other features). As such, the single-board computer 508 may include the necessary features and/or components to enable the single-board computer 508 to receive and execute the code transmitted to it by the remote multiplexer 516. In some embodiments, once the single-board computer 508 receives the code from the remote multiplexer 516, the single-board computer 508 may compile, interpret, and/or otherwise execute the code in a similar manner as if the user had entered the code directly into the single-board computer (e.g., using a keyboard and/or mouse). As discussed above, the single-board computer 508 may be embedded within the robotic device 512 (e.g., which may include a toy car or other type of robotic device). In particular, the single-board computer 508 may be configured to control the robotic device 512 upon execution of the code received from the remote multiplexer 516. Thus, from the perspective of the user, the code may appear to be delivered directly, and in real-time, from the user device 502 to the single-board computer 508 and/or the robotic device 512 via a single communication link (e.g., via short-range wireless communication). However, in accordance with embodiments of the present disclosure, the code is in fact delivered in real-time from the user device 502 to the single-board computer 508 and/or the robotic device 512 via two distinct communication links or two distinct communication channels. For purposes of illustration, and considering the example where the robotic device 512 includes a toy car, the code received from the remote multiplexer 516 and executed by the single-board computer 508 may cause the toy car to perform any of a variety of actions such as move forward, move backward, turn right, turn left, detecting a sign or other object (e.g., via the camera 318 or other sensor mounted on the robotic device 300). While some examples of actions that may be performed in response to executing the code have been given, it will be understood that these examples are merely exemplary, and other actions may similarly be performed without departing from the scope of the present disclosure.

In various embodiments, execution of the code by the single-board computer 508, as discussed above, may result in a variety of output data (e.g., generated by the single-board computer). For example, in some cases, the output data may include data that indicates successful termination of the executed program. In some embodiments, the output data may include data that indicates abnormal termination of the executed program (e.g., an error has occurred, and the user should review their code). In some examples, the output data may include images and/or video captured by the camera 318 of the robotic device 300. While some examples of output data generated in response to execution of the code by the single-board computer 508 have been given, it will be understood that these examples are merely exemplary, and other types of output data may alternatively and/or additionally be generated without departing from the scope of the present disclosure. Regardless of the type of output data generated, after execution of the code by the single-board computer 508, the method 400 may proceed to block 410 where the generated output is received at the remote multiplexer from the single-board computer. In various embodiments, the generated output corresponds to the instructions (code) received and executed by the single-board computer 508. With reference to FIG. 5, and in an embodiment of block 410, the output generated by the single-board computer 508 may be sent to the remote multiplexer 516 via the second communication link 532 or second communication channel (e.g., through the network 106). In some embodiments, the single-board computer 508 may also send the first identifier (previously received by the remote multiplexer 516) that identifies the user device 502 from which the received code originated. Stated another way, the single-board computer 508 provides the first identifier to the remote multiplexer 516 identify the particular user device that is to receive the generated output data. If, in certain cases, the single-board computer 508 provides output data for a user device with which the single-board computer 508 is not paired, then the remote multiplexer 516 may disregard a request to deliver output data to the non-paired user device.

The method 400 then proceeds to block 412 where the output data is transmitted from the remote multiplexer to the web browser executing on the user device identified by the first identifier. With reference to FIG. 5, and in an embodiment of block 412, the output data received at the remote multiplexer 516 may be forwarded to the web browser 509 executing on the user device 502 identified by the first identifier (e.g., the user device 502 with which the single-board computer 508 is paired) via a first communication link 530 or first communication channel (e.g., through the network 106).

In some embodiments, once the user device receives the output data from the remote multiplexer, the method 400 proceeds to block 414 where the output data is displayed via an application interface of the web browser. Referring to FIGS. 5 and 13, and in an embodiment of block 414, the output data received by the web browser 509 executing on the user device 502 may display the output data via the GUI 507. For example, in some embodiments, the output data may be displayed via the terminal window 1302. In some cases, for example, when the output data includes images and/or video, the output data may be displayed via the camera window 1306. In other embodiments, the output data may be displayed via a pop-up window or other window of the web-based application.

It will be understood that the examples given above, for example with reference to the methods 400 and 700, are merely exemplary and are not meant be limiting in any way. Moreover, those of skill in the art in possession of this disclosure will recognize that various additional embodiments may be implemented in accordance with the methods described herein, while remaining within the scope of the present disclosure.

Figure 14:
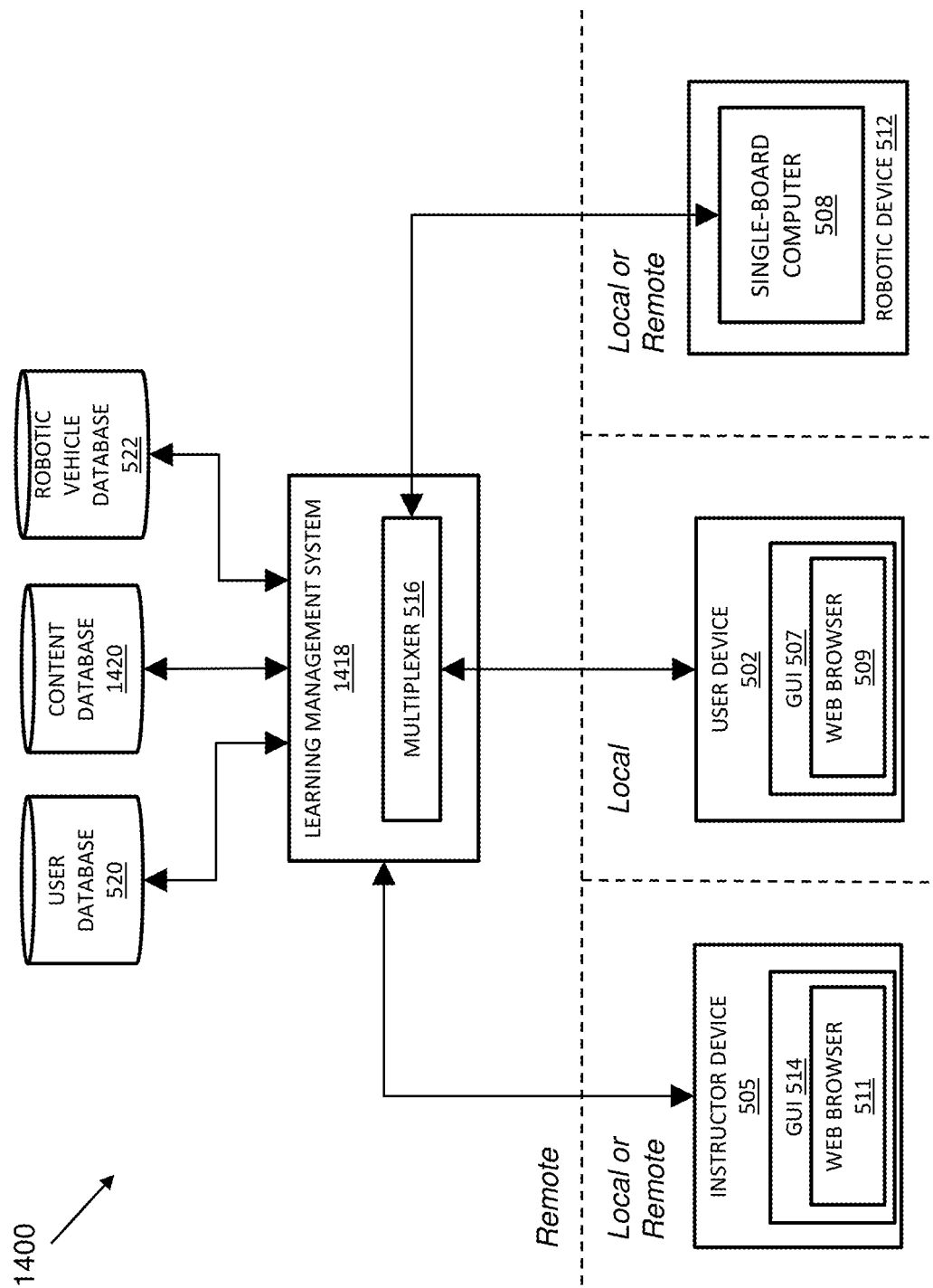
FIG. 14 provides a schematic diagram that illustrates exemplary communication links between a user device, a single-board computer, an instructor device, and a multiplexer integrated with a learning management system (LMS), in accordance with some embodiments.

As previously discussed, embodiments of the present disclosure may also provide for integration of the remote multiplexer with a learning management system (LMS), for example, to provide enhanced systems and methods for teaching programming and/or robotics to students in a classroom, regardless of whether the classroom is physical or virtual (e.g., remote). By way of example, and with reference to FIG. 14, illustrated therein is a schematic diagram 1400 that illustrates exemplary communication links between a user device 502, a single-board computer 508, an instructor device 505, and a multiplexer 516 integrated with a learning management system (LMS) 1418, in accordance with some embodiments. In various aspects, the example of FIG. 14 is substantially the same as the example of FIG. 5. However, the example of FIG. 14 further illustrates the remote multiplexer 516 integrated with the LMS 1418, the instructor device 505, and a content database 1420. Similar to the user device 502 and the single-board computer 508, the instructor device 505 and the integrated multiplexer 116/LMS 1418 are connected to and communicate via the network 106 by way of one or more network communication devices. In various embodiments, the instructor device 505 may be a local or remote device, and the integrated multiplexer 116/LMS 1418 may be a remote device. By way of example, the instructor device 505 may include the instructor device 105, the multiplexer 516 may include the multiplexer 116, and the LMS 1418 may include the LMS 118, discussed above. As previously described, the single-board computer 508 may also be embedded within the robotic device 512.

In some embodiments, the instructor device 105 may include a graphical user interface (GUI) 514, where a web browser 511 executing on the instructor device 505 is displayed via the GUI 514. In some examples, and similar to a user operating the user device 502, an instructor operating the instructor device 505 may download a website that provides the web-based application with which the instructor may interface. In some embodiments, the instructor, logged into the web-based application using instructor credentials, may be able to access additional features of the web-based application. For instance, in some cases, the instructor may use the web-based application to provide student grades, review student coursework and progress, provide hints or tips to the student to enable the student to continue working through the curriculum at a reasonable pace, conduct chat sessions with students, administer an educational course or otherwise manage the delivery of educational content (e.g., from the LMS 1418) to a student via an LMS portion of the web-based application accessible to the student via the user device 502

As shown in FIG. 14, the LMS 1418 is also connected to the content database 1420, where the content database may store course content materials, a student database, student assignments and grades, and/or other course or student related data. Generally, as previously described, the LMS 1418 provides for the administration and delivery of educational content to a student operating the user device 502, while also enabling a teacher (instructor) to monitor and provide feedback to the student regardless of the teacher's level of technological expertise. In some cases, for example, when the instructor is at the same physical location as the student, the instructor feedback may be provided in person or electronically via the web-based application. However, for the case of a virtual (remote) classroom, the instructor feedback may be provided electronically (e.g., by the web-based application). Thus, in various embodiments, a single web-based application (e.g., accessible to both the student and the instructor via the user device 502 and the instructor device 505) may be used both to deliver educational content (e.g., from the LMS 1418) and to deliver computer code from the user device 502 (and in some cases from the instructor device 505) to the single-board computer 508 to control operation of the robotic device 512. For example, a student may learn programming topics via the LMS portion of the web-based application by selecting the "Curriculum" menu option from the menu bar 802. In addition, a student may provide computer code via the web-based application and utilize the two distinct communication links, transparent to the student, to deliver code from a user device 502 to a student's single-board computer, which may be the single-board computer 508 (e.g., via the remote multiplexer 516). In a classroom environment, a student may be able to iteratively modify their code in response to observing the robotic device 512, in real-time, within a physical space of the classroom (or in response to observing the robotic device at a remote location, for example, via a remote camera). Further, because the LMS 1418 and the multiplexer 516 are integrated, the student may learn principles of programming and robotics (e.g., via the LMS 1418) and, without switching applications or platforms, practice what they have learned by writing and delivering code to their single-board computer and/or to their robotic device in real-time by way of the multiplexer 516 and the two distinct communication links. In addition, the ease by which the two communication links are established, by simply connecting a user device, single-board computer, and multiplexer to a network, frees students and teachers from having to worry about how to connect a computer to a remote device, which is often seen as a significant burden and obstacle for even those having some computer networking experience. Thus, embodiments of the present disclosure provide for effective integration of teaching programming and/or robotics with a real-time and user-transparent method for code delivery.

Thus, systems and methods have been described for programming an embedded system, such as an embedded single-board computer (SBC), in real-time and in a manner that is largely transparent to a user. In the various embodiments described herein, delivery of the computer code from the user's computing device to the single-board computer is mediated by a remote multiplexer. By way of example, computer code written, loaded, or modified at the computing device may be delivered from the computing device to the multiplexer, for example, along with an identifier that identifies a particular single-board computer to be programmed.

The multiplexer, in turn, may use the identifier to deliver the code to the identified single-board computer. Upon receiving the code, the single-board computer may compile, interpret, and/or execute the code in a similar manner as if the user had entered the code directly into the single-board computer (e.g., using a keyboard and/or mouse). In addition, embodiments of the present disclosure provide a system and method that facilitates teaching programming and/or robotics to students in a classroom, regardless of whether the classroom is physical or virtual (e.g., remote). In various examples, the multiplexer may be integrated with a learning management system (LMS). Thus, in some embodiments, a single web-based application may be used both to deliver educational content and to deliver computer code to a single-board computer. In various examples, and because the LMS and the multiplexer are integrated, the student may learn principles of programming and robotics (e.g., via the LMS) and, without switching applications or platforms, practice what they have learned by writing and delivering code to their single-board computer and/or to their robotic device in real-time. Thus, embodiments of the present disclosure provide for effective integration of teaching programming and/or robotics with a real-time and user-transparent method for code delivery.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
   pairing, at a remote device, a user device to a computer-controlled vehicle, wherein the user device is configured to communicate with the remote device using a first communication channel, wherein the computer-controlled vehicle is configured to communicate with the remote device using a second communication channel, wherein the pairing includes providing a randomly-generated alphanumeric code to the computer-controlled vehicle, receiving another alphanumeric code from the user device, and matching the randomly-generated alphanumeric code to the another alphanumeric code, and wherein the matching the randomly-generated alphanumeric code to the another alphanumeric code pairs the user device to the computer-controlled vehicle without providing an executable instruction to the computer-controlled vehicle;
   after the pairing, receiving, at an input of the remote device and from the user device, a specific sequence of program code for operating the computer-controlled vehicle, wherein the specific sequence of program code received at the input of the remote device includes first content having a first format; and
   transmitting, from an output of the remote device, the same specific sequence of program code received at the input of the remote device to the computer-controlled vehicle, wherein the computer-controlled vehicle is configured to execute the specific sequence of program code including the first content having the first format, and wherein the specific sequence of program code executed by the computer-controlled vehicle provides a complete set of instructions, independent of other instructions pre-loaded into a memory of the computer-controlled vehicle prior to the pairing, to cause the computer-controlled vehicle to perform an action.

2. The method of claim 1, wherein the pairing grants permission for the first user device and the computer-controlled vehicle to communicate with each through the remote device.

3. The method of claim 1, further comprising:
   prior to the pairing, receiving, at the remote device, a request to pair the user device to the computer-controlled vehicle;
   wherein the pairing the user device to the computer-controlled vehicle is performed in response to the request.

4. The method of claim 3, further comprising:
   responsive to the request, prompting, by the remote device, the user device to provide an identification number associated with the computer-controlled vehicle; and
   in response to the prompting, receiving, at the remote device and from a web browser application interface executing on the user device, the identification number.

5. The method of claim 4, further comprising:
   after receiving the identification number, searching, by the remote device, a computer-controlled vehicle database for the identification number associated with the computer-controlled vehicle; and
   in response to finding the identification number within the computer-controlled vehicle database, providing a first authentication code to the computer-controlled vehicle, wherein the computer-controlled vehicle is configured to visually display the first authentication code, and wherein the first authentication code includes the randomly-generated alphanumeric code.

6. The method of claim 5, further comprising:
   after the providing the first authentication code to the computer-controlled vehicle, receiving, at the remote device and from the web browser application interface executing on the user device, a second authentication code, wherein the second authentication code includes the another alphanumeric code.

7. The method of claim 6, further comprising:
after receiving the second authentication code, comparing, by the remote device, the second authentication code to the first authentication code; and
responsive to determining that the second authentication code matches the first authentication code, providing a pairing confirmation message to the user device for display via the web browser application interface.

8. The method of claim 1, further comprising:
in response to the pairing, storing, by the remote device and in a computer-controlled vehicle database, pairing data;
wherein the pairing data indicates that the user device and the computer-controlled vehicle have been successfully paired.

9. The method of claim 8, further comprising:
power cycling at least one of the user device and the computer-controlled vehicle; and
after the power cycling, automatically re-establishing, by the remote device, the pairing based on the stored pairing data.

10. A method, comprising:
receiving, at a remote multiplexer and from a user device, a request to pair the user device with a robotic vehicle, wherein the user device is coupled to the remote multiplexer by a first communication link, and wherein the robotic vehicle is coupled to the remote multiplexer by a second communication link;
responsive to the request, pairing, by the remote multiplexer, the user device to the robotic vehicle, wherein the pairing grants permission for the user device and the robotic vehicle to communicate with each other through the remote multiplexer;
after the pairing, receiving, at an input of the remote multiplexer and from the user device, a specific sequence of program code for controlling the robotic vehicle, wherein the specific sequence of program code received at the input of the remote multiplexer includes first content having a first format; and
transmitting, from an output of the remote multiplexer, the same specific sequence of program code received at the input of the remote multiplexer to the robotic vehicle, wherein the robotic vehicle is configured to execute the specific sequence of program code including the first content having the first format.

11. The method of claim 10, wherein the user device is operated by a user located at a same physical location as the user device, and wherein the robotic vehicle is located at the same physical location as the user device or at a remote physical location.

12. The method of claim 10, wherein the robotic vehicle includes a camera that is configured to scan a quick response (QR) code to establish the second communication link between the robotic vehicle and the remote multiplexer.

13. The method of claim 10, wherein the pairing further includes:
receiving, at the remote multiplexer and from the user device, an identification number associated with the robotic vehicle;
searching, by the remote multiplexer, a remote database for the identification number associated with the robotic vehicle; and
based on finding the identification number within the remote database, providing a first authentication code to the robotic vehicle, wherein the robotic vehicle is configured to visually display the first authentication code.

14. The method of claim 13, wherein the pairing further includes:
after the providing the first authentication code to the robotic vehicle, receiving, at the remote multiplexer and from the user device, a second authentication code;
in response to the receiving the second authentication code, comparing, by the remote multiplexer, the second authentication code to the first authentication code; and
after determining that the second authentication code matches the first authentication code, transmitting a pairing confirmation message to at least one of the user device and the robotic vehicle.

15. The method of claim 10, further comprising:
in response to the pairing, storing, by the remote multiplexer and in a remote database, pairing data that indicates that the user device and the robotic vehicle define a user device-robotic vehicle pair.

16. The method of claim 15, further comprising:
powering OFF at least one of the user device and the robotic vehicle; and
after the powering OFF, powering ON the at least one of the user device and the robotic vehicle and automatically re-establishing, by the remote multiplexer, the user device-robotic vehicle pair based on the stored pairing data.

17. A method, comprising:
transmitting, to a remote multiplexer and from a user device, a request to pair the user device to a computer-controlled vehicle, wherein the user device is coupled to the remote multiplexer by a first communication link, and wherein the computer-controlled vehicle is coupled to the remote multiplexer by a second communication link;
in response to the request, receiving, from the remote multiplexer, confirmation of successful pairing between the user device and the computer-controlled vehicle;
after receiving the confirmation of the successful pairing, transmitting, to the remote multiplexer, a specific sequence of program code for controlling the computer-controlled vehicle using a web browser on the user device that provides an application interface for entry of the specific sequence of program code, wherein the specific sequence of program code includes first content having a first format; and
responsive to the transmitting, receiving, from the remote multiplexer, output data associated with execution of the specific sequence of program code including the first content having the first format by the computer-controlled vehicle, wherein the output data is displayed by the application interface.

18. The method of claim 17, further comprising:
prior to receiving the confirmation of successful pairing, providing, to the remote multiplexer and from the user device, an authentication code via the application interface.

19. The method of claim 18, wherein the receiving the confirmation of successful pairing indicates that the authentication code matched a known authentication code stored within a remote database accessible to the remote multiplexer.

20. The method of claim 17, further comprising:
power cycling the user device; and
after the power cycling, receiving, from the remote multiplexer, confirmation that the pairing between the user device and the computer-controlled vehicle has been successfully re-established.

\* \* \* \* \*